US012472431B2

(12) United States Patent
Chen et al.

(10) Patent No.: US 12,472,431 B2
(45) Date of Patent: Nov. 18, 2025

(54) USER INTERFACE DISPLAY METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Xiaofeng Chen, Guangdong (CN); Jingchen Shi, Guangdong (CN); Yun Ai, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 315 days.

(21) Appl. No.: 18/302,333

(22) Filed: Apr. 18, 2023

(65) Prior Publication Data

US 2023/0249073 A1 Aug. 10, 2023

Related U.S. Application Data

(63) Continuation of application No. PCT/CN2022/108865, filed on Jul. 29, 2022.

(30) Foreign Application Priority Data

Aug. 20, 2021 (CN) ......................... 202110960461.3

(51) Int. Cl.
*A63F 13/537* (2014.01)
*A63F 13/2145* (2014.01)
*A63F 13/52* (2014.01)

(52) U.S. Cl.
CPC ........ *A63F 13/537* (2014.09); *A63F 13/2145* (2014.09); *A63F 13/52* (2014.09); *A63F 2300/308* (2013.01)

(58) Field of Classification Search
CPC ................ A63F 13/5378; A63F 13/537; A63F 2300/6653
See application file for complete search history.

(56) References Cited

U.S. PATENT DOCUMENTS 7,497,776 B1 * 3/2009 Roman ............... A63F 13/5375 463/31
7,850,525 B2 * 12/2010 Shimizu .................. A63F 13/57 463/31

(Continued)

FOREIGN PATENT DOCUMENTS

CN 107890673 A 4/2018
CN 110917618 A 3/2020

(Continued)

OTHER PUBLICATIONS

International Search Report for PCT/CN2022/108865 dated Nov. 3, 2022.

(Continued)

*Primary Examiner* — Steve Rowland
(74) *Attorney, Agent, or Firm* — Sughrue Mion, PLLC

(57) ABSTRACT

A user interface display method and apparatus, a device, and a storage medium, in the field of graphical user interfaces. The method includes: displaying a virtual environment image, an operation control, and a minimap, the virtual environment image being an image in which a virtual environment around a virtual character, which is located in a virtual world, is observed from a perspective of the virtual character, wherein the minimap presents a thumbnail of the virtual world in which the virtual character is located, controlling, based on a control input via the operation control, activities of a virtual character in the virtual environment, and displaying, based on the virtual character being influenced by a target event in the virtual environment, (Continued)

the virtual environment image in a shielded state and the minimap in a blurred state.

20 Claims, 11 Drawing Sheets

(56) References Cited

U.S. PATENT DOCUMENTS

| | | | | |
|---|---|---|---|---|
| 10,603,589 | B2 * | 3/2020 | Miyamoto | A63F 13/56 |
| 12,281,912 | B2 * | 4/2025 | Apuy | G06F 3/0482 |
| 2001/0046896 | A1 * | 11/2001 | Miyamoto | A63F 13/5252 463/31 |
| 2002/0006817 | A1 * | 1/2002 | Kobayashi | A63F 13/10 463/4 |
| 2007/0218965 | A1 * | 9/2007 | Tilston | A63F 13/45 463/2 |
| 2007/0218966 | A1 * | 9/2007 | Tilston | A63F 13/5378 463/5 |
| 2011/0172013 | A1 * | 7/2011 | Shirasaka | A63F 13/92 345/173 |
| 2011/0245942 | A1 * | 10/2011 | Yamamoto | A63F 13/803 700/91 |
| 2011/0283865 | A1 * | 11/2011 | Collins | G06F 3/16 84/464 R |
| 2012/0256961 | A1 | 10/2012 | Ogasawara et al. | |
| 2018/0024660 | A1 * | 1/2018 | Wang | G06F 3/04817 273/110 |
| 2020/0408521 | A1 * | 12/2020 | Lyons | G04G 21/04 |
| 2021/0379491 | A1 * | 12/2021 | Liu | A63F 13/837 |

FOREIGN PATENT DOCUMENTS

| | | | |
|---|---|---|---|
| CN | 111760280 | A | 10/2020 |
| CN | 112057863 | A | 12/2020 |
| CN | 112057864 | A | 12/2020 |
| CN | 113577765 | A | 11/2021 |
| JP | 2019-67390 | A | 4/2019 |

OTHER PUBLICATIONS

Written Opninon for PCT/CN2022/108865 dated Nov. 3, 2022.

"CoD: BO3 3 effects of smoke grenades you don't know, Awakening FPS" Dec. 28, 2015, (7 pages) https://kakusei-fps.com/cod/cod-bo3/amazing-smoke-grenade-man/.

[PUBG Mobile Strategy] Use the minimap to find enemies! You can tell the distance by sound and direction, AppBank, May 29, 2018, pp. 1-7 (8 pages) https://www.appbank.net/2018/05/29/iphone-application/1555146.php.

Japanese Office Action dated Oct. 1, 2024 in Application No. 2023-571346.

* cited by examiner

USER INTERFACE DISPLAY METHOD AND APPARATUS, DEVICE, AND STORAGE MEDIUM

CROSS-REFERENCE TO RELATED APPLICATION(S)

This application is a continuation application of International Application No. PCT/CN2022/108865, filed on Jul. 29, 2022 which claims priority to Chinese Patent Application No. 202110960461.3 filed with the China National Intellectual Property Administration on Aug. 20, 2021, the disclosures of which are herein incorporated by reference in their entireties.

FIELD

Embodiments of the disclosure relate to the field of graphical user interfaces, and in particular, to a user interface display method and apparatus, a device, and a storage medium.

BACKGROUND

A user may operate a game character in a game program to compete. The game program is provided with a virtual world, and the game character is a virtual character located in the virtual world.

A virtual environment picture, an operation control and a map presentation control are displayed on a terminal. The virtual environment picture is a picture obtained by observing the virtual world from the perspective of the current virtual character. The operation control is a control for controlling the virtual character to execute a certain behavior. The map presentation control is a control for displaying an overhead map of the virtual world. In a case that the virtual character is blinded by flash bombs or similar blinding effect skills, it is necessary to shield information obtainable by the virtual character from the virtual environment. In the related art, the blinding effect is achieved by shielding the virtual environment picture.

However, in the related art, all the information of the virtual environment picture obtained by the virtual character is shielded and the blinding effect is constant. The blinding scene simulated in this manner is not real.

SUMMARY

The embodiments of this disclosure provide a user interface display method and apparatus, a device, and a storage medium, which can simulate a more real blinding effect by superimposing a mask layer on a display layer and a blur effect layer on an information layer.

According to some embodiments, a user interface display method is provided. The method includes:

displaying a virtual environment image, an operation control and a minimap, the virtual environment image being an image in which a virtual environment around a virtual character, which is located in a virtual world, is observed from a perspective of the virtual character, wherein the minimap presents a thumbnail of the virtual world in which the virtual character is located;

controlling, based on a control input via the operation control, activities of the virtual character in the virtual environment; and displaying, based on the virtual character being influenced by a target event in the virtual environment, the virtual environment image in a shielded state and the minimap in a blurred state.

According to some embodiments, a user interface display apparatus is provided. The apparatus includes: at least one memory configured to store program code; and at least one processor configured to read the program code and operate as instructed by the program code, the program code comprising display code configured to cause the at least one processor to display a virtual environment image, an operation control, and a minimap, the virtual environment image being an image in which a virtual environment, is observed from a perspective of a virtual character, wherein the minimap presents a thumbnail of the virtual world in which the virtual character is located;

control code configured to cause the at least one processor to control, based on a control input via the operation control, activities of the virtual character in the virtual environment; and shielding code configured to cause the at least one processor to display, based on the virtual character being influenced by a target event in the virtual environment, the virtual environment image in a shielded state and the minimap in a blurred state.

According to some embodiments, a computer device is provided. The computer device includes: a processor and a memory, the memory storing at least one program, and the at least one program being loaded and executed by the processor to implement the user interface display method described in the foregoing aspect.

According to some embodiments, a non-transitory computer-readable storage medium storing computer code that when executed by at least one processor causes the at least one processor to:

display a virtual environment image, an operation control, and a minimap, the virtual environment image being an image in which a virtual environment around a virtual character, which is located in a virtual world, is observed from a perspective of the virtual character, wherein the minimap presents a thumbnail of the virtual world in which the virtual character is located;

control, based on a control input via the operation control, activities of the virtual character in the virtual environment; and display, based on the virtual character being influenced by a target event in the virtual environment, the virtual environment image in a shielded state and the minimap in a blurred state.

According to some embodiments, a computer program product is provided. The computer program product stores at least one instruction, and the at least one instruction is loaded and executed by a processor to implement the user interface display method described in the foregoing embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
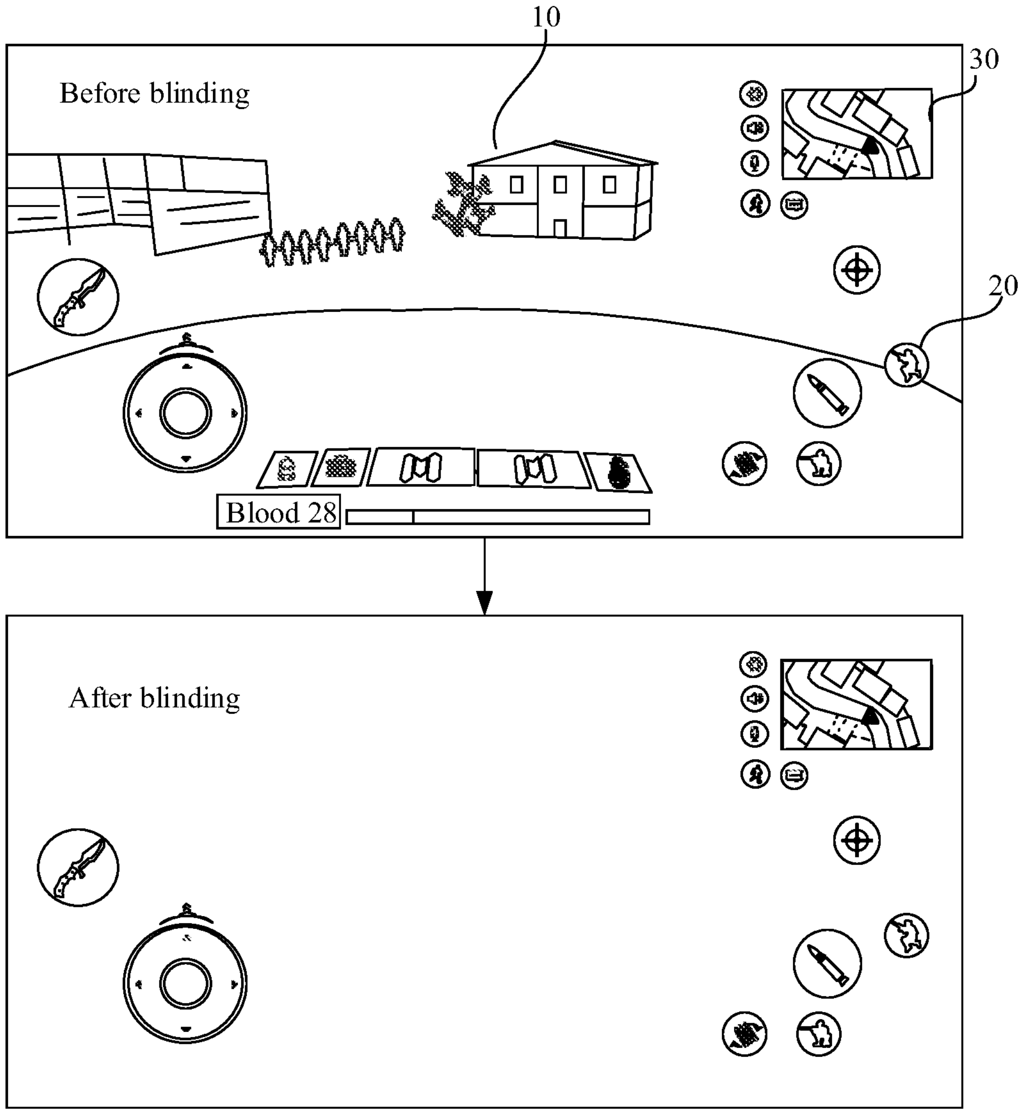
FIG. 1 is a schematic diagram of a user interface display method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The beneficial effects brought about by the technical solutions at least include: A user interface is displayed. Activities of a virtual character in a virtual environment are controlled. In response to the virtual character being influenced by a target event in the virtual environment, a virtual environment picture is displayed as a shielded state, and a minimap is displayed as a blurred state. A blinding effect of a real person is simulated by using the virtual character. A blinding situation of the real person is simulated by displaying the virtual environment picture as the shielded state, and a situation where the real person still has a certain memory in a case of blinding is simulated by displaying the minimap as the blurred state so as to simulate a more real blinding experience effect in the foregoing manners.

First, the nouns involved in the embodiments of the disclosure are described:

Virtual Environment: a virtual environment displayed (or provided) when an application is run on a terminal. The virtual environment may be a simulated world of a real world, a semi-simulated semi-fictional three-dimensional world, or a purely fictional three-dimensional world. The virtual environment may be any one of a two-dimensional virtual environment, a 2.5-dimensional virtual environment, and a three-dimensional virtual environment.

Virtual Character: a movable object in the virtual environment. The movable object may be at least one of a virtual animal or an animated character. In some embodiments, when the virtual environment is a three-dimensional virtual environment, the virtual character may be a three-dimensional virtual model, and each virtual character has a corresponding shape and volume in the three-dimensional virtual environment, and occupies a part of space in the three-dimensional virtual environment. In some embodiments, the virtual character is a three-dimensional character constructed based on a three-dimensional human skeleton technology, and the virtual character realizes different external images by wearing different skins. In some embodiments, the virtual character may also be implemented by using a 2.5-dimensional or 2-dimensional model. This is not limited herein.

Information Shielding: shielding information obtainable by the virtual character after the virtual character is hit by a target event in an application supporting the virtual environment, including but not limited to surrounding visual fields, map landforms, enemy locations, and the like.

Layer: a UI interface in a game is composed of a plurality of layers.

Some embodiments of the disclosure provide a technical solution of a user interface display method. As shown in FIG. 1, a virtual environment picture (or a virtual environment image) 10, an operation control 20 and a map presentation control (or minimap) 30 are displayed on a user interface. The user interface includes a display layer, an operation layer and an information layer. The display layer is configured to display the virtual environment picture 10. The virtual environment picture 10 represents virtual environment information obtainable by a virtual character at a current location. The operation layer is configured to display the operation control. The operation control 20 is a control for controlling the virtual character to execute a certain behavior. The information layer displays the map presentation control 30. The map presentation control 30 is a control for representing an overhead map of a virtual world. Activities of the virtual character in a virtual environment are controlled by the operation control 20. In response to the virtual character being influenced by a target event in the virtual environment, the virtual environment picture 10 is displayed as a shielded state, and the map presentation control 30 is displayed as a blurred state.

When the virtual character is influenced by the target event in the virtual environment, this embodiment is exemplified by the target event that the virtual character is hit by a flash bomb. After the virtual character is hit by the flash bomb, a mask layer is added between the virtual environment picture 10 displayed on the display layer and the operation control 20 displayed on the operation layer. The mask layer is configured to shield the virtual environment picture 10 displayed on the display layer. A blur effect layer is added on the map presentation control 30 displayed on the information layer. The blur effect layer is configured to shield the map presentation control 30 displayed on the information layer.

For example, in a case that the virtual character is hit by the flash bomb, the virtual character temporarily loses vision, but still has a blur memory of a map location, has no limitation of action, and still has counteraction ability. The virtual environment picture 10 displayed on the display layer is shielded by the mask layer, so that the virtual character is difficult to obtain information of the virtual environment, but the virtual character may still be controlled to execute a certain behavior action through the operation control 20. Although the virtual character cannot obtain the information of the virtual environment in a case of being blinded, the virtual character still has a blur memory for the current map location. Therefore, the blur effect layer enables the map presentation control 30 displayed on the information layer to show a blurred state, whereby the blur memory of map information by the virtual character is simulated.

Due to the limited scope of influence of the flash bomb, different blinding effects may be produced when the virtual character is hit by the flash bomb at different locations. For example, the virtual character is outside the scope of influence of the flash bomb, and none of the virtual environment picture 10, the operation control 20 and the map presentation control 30 on the user interface is influenced by the flash bomb. In a case that the scope of influence of the flare bomb includes a display layer but does not include a mask layer, only the partial virtual environment picture 10 in the user interface is shielded, and the map presentation control 30 is in a clear state. In a case that the scope of influence of the flash bomb includes a mask layer but does not include an information layer, the entire virtual environment picture 10 in the user interface is shielded, and the map presentation control 30 is in a clear state. In a case that the scope of influence of the flash bomb includes an information layer but does not include a blur effect layer, the entire virtual environment picture 10 in the user interface is shielded and the partial map presentation control 30 is displayed as a blurred state. In a case that the scope of influence of the flare bomb includes a blur effect layer, the entire virtual environment picture 10 in the user interface is shielded and the entire map presentation control 30 is displayed as a blurred state.

The embodiments of the disclosure can achieve real blinding simulation effects of the virtual character under different scopes of influence of the target event. In a case that the virtual character is hit by a virtual prop, although the virtual character loses vision, the virtual character still has memory and reactivity. By displaying the virtual environment picture 10 as a shielded state and the map presentation control 30 as a blurred state, a more real experience effect of blinding can be simulated.

Figure 2:
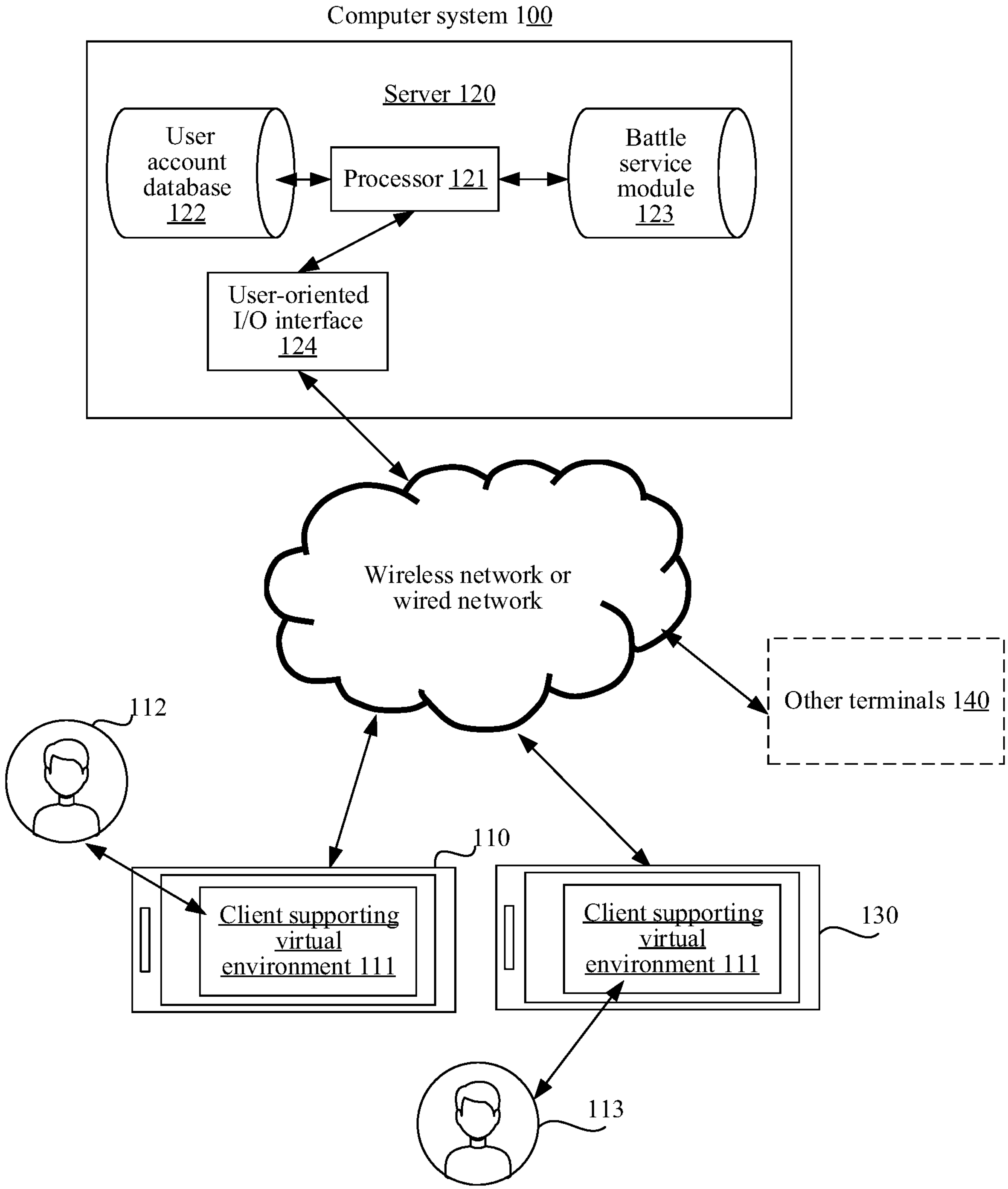
FIG. 2 is a structural block diagram of a computer system according to some embodiments.

FIG. 2 shows a structural block diagram of a computer system according to some embodiments. The computer system 100 includes: a first terminal 110, a server 120, and a second terminal 130.

A client 111 supporting a virtual environment is installed and run in the first terminal 110, and the client 111 may be a multiplayer online battle program. When the first terminal 110 runs the client 111, a user interface of the client 111 is displayed on a screen of the first terminal 110. The client 111 may be any one of an escape shooting game, a virtual reality (VR) application, an augmented reality (AR) program, a three-dimensional map program, a virtual reality game, an augmented reality game, a first-person shooting (FPS) game, a third-personal shooting (TPS) game, a multiplayer online battle arena (MOBA) game, and a simulation game (SLG). This embodiment is exemplified by the client 111 being an MOBA game. The first terminal 110 is a terminal used by a first user 112. The first user 112 uses the first terminal 110 to control activities of a first virtual character located in a virtual environment. The first virtual character may be referred to as a virtual character of the first user 112. The activities of the first virtual character include, but are not limited to: at least one of moving, jumping, transmitting, releasing skills, adjusting body posture, crawling, walking, running, riding, flying, jumping, driving, picking up, shooting, attacking, and throwing. In some embodiments, the first virtual character is a first virtual character, such as a simulated character role or an animated character role.

A client 131 supporting a virtual environment is installed and run in the second terminal 130, and the client 131 may be a multiplayer online battle program. When the second terminal 130 runs the client 131, a user interface of the client 131 is displayed on a screen of the second terminal 130. The client may be any one of an escape shooting game, a VR application, an AR program, a three-dimensional map program, a virtual reality game, an augmented reality game, FPS, TPS, MOB A, and SLG. This embodiment is exemplified by the client being an MOBA game. The second terminal 130 is a terminal used by a second user 113. The second user 113 uses the second terminal 130 to control activities of a second virtual character located in the virtual environment. The second virtual character may be referred to as a virtual character of the second user 113. In some embodiments, the second virtual character is a second virtual character, such as a simulated character role or an animated character role.

In some embodiments, the first virtual character and the second virtual character are in the same virtual environment. In some embodiments, the first virtual character and the second virtual character may belong to the same camp, the same team and the same organization, have a friend relationship, or have a temporary communication permission. In some embodiments, the first virtual character and the second virtual character may belong to different camps, different teams and different organizations, or have an adversarial relationship.

In some embodiments, the clients installed on the first terminal 110 and the second terminal 130 are the same, or the clients installed on the two terminals are the same type of clients on different operating system platforms (Android or IOS). The first terminal 110 may generally refer to one of a plurality of terminals, and the second terminal 130 may generally refer to another of the plurality of terminals. This embodiment is exemplified only by the first terminal 110 and the second terminal 130. The first terminal 110 and the second terminal 130 have the same or different device types. The device types include: at least one of a smartphone, a wearable device, an on-vehicle terminal, a smart television, a tablet personal computer, an e-book reader, an MP3 player, an MP4 player, a laptop portable computer, and a desktop computer.

Only two terminals are shown in FIG. 2. However, in some embodiments, there are a plurality of other terminals 140 having access to the server 120. In some embodiments, there are also one or more terminals 140 corresponding to a developer. A development and editing platform for a client supporting the virtual environment is installed on the terminal 140. The developer may edit and update the client on the terminal 140, and transmit an updated client installation package to the server 120 through a wired or wireless network. The first terminal 110 and the second terminal 130 may download the client installation package from the server 120 to implement the update of the client.

The first terminal 110, the second terminal 130, and the other terminals 140 are connected to the server 120 through the wireless network or the wired network.

The server 120 includes at least one of a server, a plurality of servers, a cloud computing platform, and a virtualization center. The server 120 is configured to provide a background service for the client supporting the three-dimensional virtual environment. In some embodiments, the server 120 undertakes primary computing tasks, and the terminal undertakes secondary computing tasks. The server 120 may undertake secondary computing tasks, and the terminal undertakes primary computing tasks. The server 120 and the terminal may perform cooperative computing using a distributed computing architecture.

In some embodiments, the server 120 includes a processor 121, a user account database 122, a battle service module 123, and a user-oriented input/output (I/O) interface 124. The processor 121 is configured to load an instruction stored in the server 120 and process data in the user account database 122 and the battle service module 123. The user account database 122 is configured to store data of a user account used by the first terminal 110, the second terminal 130 and the other terminals 140, such as a head portrait of the user account, a nickname of the user account, a combat effectiveness index of the user account, and a service region where the user account is located. The battle service module 123 is configured to provide a plurality of battle rooms for users to battle, such as a 1V1 battle, a 3V3 battle, or a 5V5 battle. The user-oriented I/O interface 124 is configured to communicate data with the first terminal 110 and/or the second terminal 130 through the wireless network or the wired network.

Figure 3:
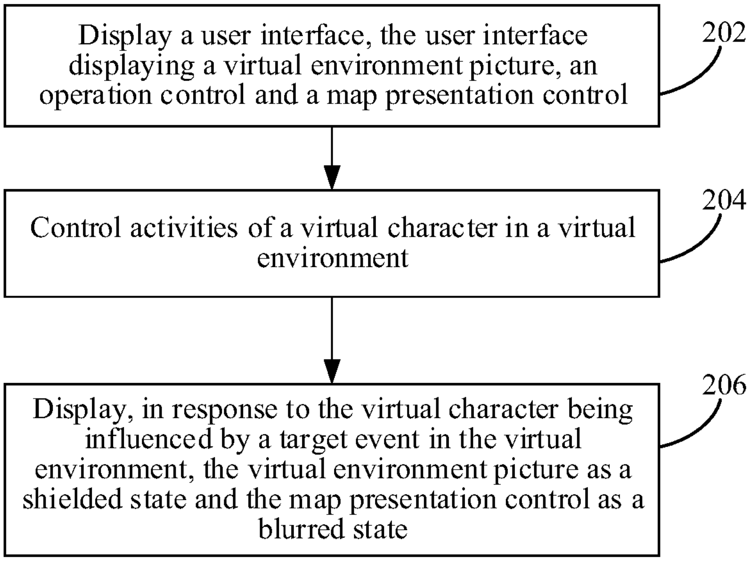
FIG. 3 is a flowchart of a user interface display method according to some embodiments.

FIG. 3 is a flowchart of a user interface display method according to some embodiments. The method may be performed by a terminal or a client on the terminal in a system as shown in FIG. 2. The method includes the following operations:

Operation 202: Display a user interface, the user interface displaying a virtual environment picture, an operation control and a map presentation control.

A virtual environment is an environment in which a virtual character is located in a virtual world during the running of an application in the terminal. In some embodiments, the virtual character is observed by a camera model in the virtual world. The virtual environment picture displays a picture, (or an image), observed to the virtual environment from a perspective determined based on the virtual character.

In some embodiments, the camera model automatically follows the virtual character in the virtual world. That is, when the location of the virtual character in the virtual world is changed, the camera model is simultaneously changed following the location of the virtual character in the virtual world, and the camera model is always within a preset distance range of the virtual character in the virtual world. In some embodiments, relative locations of the camera model and the virtual character do not change during the automatic following process.

The camera model refers to a three-dimensional model located around the virtual character in the virtual world. When a first-person perspective is adopted, the camera model is located near or at the head of the virtual character. When a third-person perspective is adopted, the camera model may be located behind the virtual character and bound with the virtual character, and may also be located at any location at a preset distance from the virtual character. The virtual character located in the virtual world may be observed from different angles by means of the camera model. In some embodiments, the camera model is located behind the virtual character (for example, the head and shoulder of the virtual character) when the third-person perspective is a first-person over-shoulder perspective. In some embodiments, in addition to the first-person perspective and the third-person perspective, the perspective also includes other perspectives such as an overhead perspective. The camera model may be located above the head of the virtual character when the overhead perspective is adopted. The overhead perspective is a perspective for observing the virtual world at an overhead angle. In some embodiments, the camera model is not actually displayed in the virtual world. That is, the camera model is not displayed in the virtual world displayed on the user interface.

The camera model is exemplified by being at any location at a preset distance from the virtual character. In some embodiments, a virtual character corresponds to a camera model. The camera model may rotate with the virtual character as a rotation center. For example, the camera model is rotated by taking any point of the virtual character as a rotation center. During the rotation process, the camera model is not only rotated in terms of angle, but also offset in terms of displacement. During the rotation, the distance between the camera model and the rotation center keeps unchanged. That is, the camera model is rotated on the surface of a sphere with the rotation center as the center of the sphere. Any point of the virtual character may be any point of the head or torso of the virtual character or any point around the virtual character. This is not limited herein. In some embodiments, when the camera model observes the virtual character, the center of the perspective of the camera model points to the direction in which the point of a sphere on which the camera model is located points to the center of the sphere.

In some embodiments, the camera model may also observe the virtual character at preset angles in different directions of the virtual character.

The operation control is configured to control the virtual character to execute a certain behavior action. The behavior action includes, but is not limited thereto, at least one of walking, running, lying down, jumping, and squatting. This is not limited by this embodiment.

The map presentation control is a user interface (UI) control for presenting a map of the virtual environment. The map of the virtual environment is configured to express the spatial distribution, connection, quantity and quality features of various things in the virtual environment and the development and change states in time. The map displayed in the map presentation control may be in two-dimensional (2D) or three-dimensional (3D) form so as to quickly and intuitively reflect the situation of the current virtual environment to a user, thereby facilitating the user to formulate a use strategy and implement operations. Taking a game application as an example, the map presentation control may also be referred to as a map or a minimap for presenting, in the two-dimensional or three-dimensional form, the landforms of the virtual environment provided by the game application, such as the locations of city R, city P, or ports.

The map presentation control is configured to present a thumbnail of the virtual world in which the virtual character is located. The map presentation control may present a global map of the virtual world, and may also present a partial map of the virtual world. This is not limited herein. For example, if a user needs to monitor a certain part of the virtual world in real time, the user may set the map presentation control. After obtaining a display parameter corresponding to the map presentation control, the client controls the map presentation control to display only a part of the virtual world set by the user.

In some embodiments, the map presentation control is a UI operation control capable of receiving a user operation and responding, for example, supporting response to the user operation such as clicking/tapping, dragging, or zooming.

Operation 204: Control activities of a virtual character in a virtual environment.

The user controls the virtual character to perform activities through the operation control, and the user may control the virtual character to perform activities by pressing a button in one or more operation controls. The activities include: at least one of walking, running, lying down, jumping, and squatting. This is not limited by this embodiment. The user may also control the virtual character to cast skills or use items by pressing the button in one or more operation controls. The user may also control the virtual character through a signal generated by long pressing, clicking/tapping, double clicking/tapping, and/or sliding on a touch screen.

Operation 206: Display, in response to the virtual character being influenced by a target event in the virtual environment, the virtual environment picture as a shielded state and the map presentation control as a blurred state.

The target event includes at least one of a hit by a prop having a blinding effect and a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event, and may be popularly understood as that the virtual character in the virtual environment is within a hit range of the flash bomb.

The shielded state refers to a state where it is difficult for the virtual character to obtain information from the virtual environment. That is, it is difficult for the user to obtain information from the virtual environment picture 10 in the user interface. It may also be understood as a state where the virtual environment picture is not displayed on the user interface. In some embodiments, the shielded state refers to a state where the user cannot obtain information of the virtual environment from the virtual environment picture. In some embodiments, the shielded state refers to the virtual environment picture being displayed as a blank picture or a full black picture.

The blurred state refers to that the virtual character can only learn blur map information, and cannot clearly obtain map information. That is, the user can only obtain the blurred information from the map presentation control 30 in the user interface. In some embodiments, the blurred state refers to a state where the user only obtains limited information from the virtual environment picture. In some embodiments, the blurred state refers to a state formed by reducing at least one of resolution, brightness, and chromaticity of the map presentation control 30 in a clear state. In some embodiments, the blurred state refers to a state of a coarse-grained content obtained by replacing a fine-grained content presented by the map presentation control 30 in the clear state with the coarse-grained content. For example, the map presentation control 30 in the clear state is displayed as a #-shaped road, and the map presentation control 30 in the blurred state is displayed as a cross-shaped road. However, there is no obvious difference in image parameters such as resolution, brightness, and chromaticity therebetween.

Figure 4:
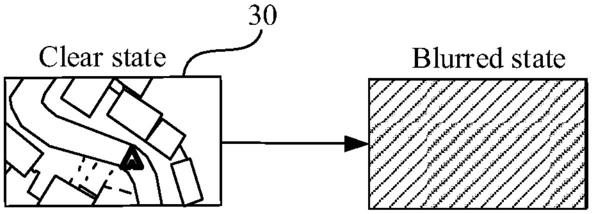
FIG. 4 is a schematic diagram of a minimap in a blurred state according to some embodiments.

In some embodiments, FIG. 4 shows a schematic diagram before and after displaying the map presentation control 30 in the user interface as a blurred state. The map presentation control 30 displays only blurred information in the blurred state.

The map presentation control 30 may also be referred to as a map or a minimap for presenting, in the two-dimensional or three-dimensional form, the landforms of the virtual environment provided by the game application. The information displayed by the map presentation control 30 includes the landforms of the virtual environment, such as the locations of city R, city P, and ports; or, the location of the virtual character; or, at least one of footstep information, gunshot information, and mechanical sound information. This is not limited herein.

The blurred state of the map presentation control 30 includes full blur and partial blur. In some embodiments, the map presentation control 30 contains n kinds of information. The full blur refers to blur of all the n kinds of information in the map presentation control 30. The partial blur refers to blur of at least one of all the n kinds of information contained in the map presentation control 30. The n kinds of information include at least two of landform information, location information of the virtual character, footstep information, gunshot information, and mechanical sound information. This is not limited herein.

In summary, according to the method provided in this embodiment, the user interface is displayed. The activities of the virtual character in the virtual environment are controlled. In a case that the virtual character is influenced by the target event in the virtual environment, the virtual environment picture 10 is displayed as the shielded state, and the map presentation control 30 is displayed as the blurred state. The virtual environment picture 10 in the shielded state and the map presentation control 30 in the blurred state truly show the blinding effect of the virtual character in a case of being influenced by the target event.

Figure 5:
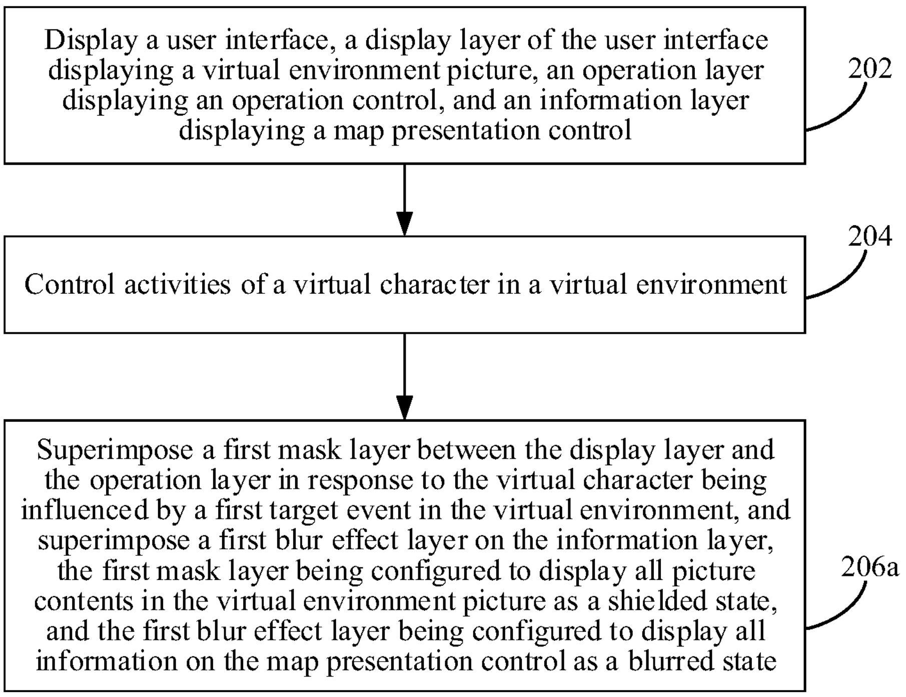
FIG. 5 is a flowchart of a user interface display method according to some embodiments.

FIG. 5 is a flowchart of a user interface display method according to some embodiments. The method may be performed by a terminal or a client on the terminal in a system as shown in FIG. 2. The method includes the following operations:

Operation 202: Display a user interface, a display layer of the user interface displaying a virtual environment picture, an operation layer displaying an operation control, and an information layer displaying a map presentation control.

The user interface is an interface for displaying a virtual environment picture 10, an operation control 20 and a map presentation control 30. The virtual environment picture 10 is used for displaying picture information covered by a visual field of a virtual character located in a virtual environment, and includes at least one of a house, a vehicle, a tree, a river, and a bridge. This is not limited by this embodiment. The operation control 20 is configured to control the virtual character to execute a certain behavior action. The map presentation control 30 is configured to present a map of the virtual environment.

Figure 7:
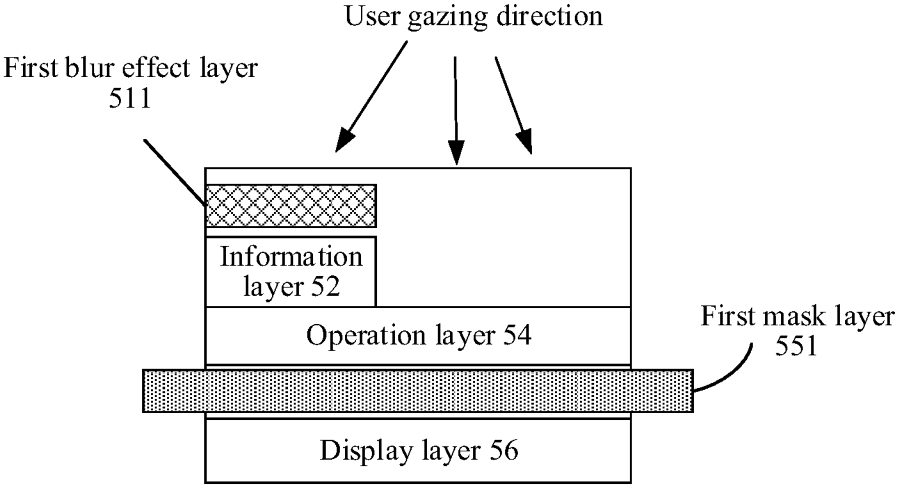
FIG. 7 is a schematic diagram of a user interface display structure according to some embodiments.

Referring to FIG. 7, the user interface includes a display layer 56, an operation layer 54 and an information layer 52. The display layer 56 is configured to display the virtual environment picture 10, the operation layer 54 is configured to display the operation control 20, and the display priority of the operation layer 54 is greater than that of the display layer 56. The information layer 52 is configured to display the map presentation control, and the display priority of the information layer 52 is greater than that of the operation layer 54.

Operation 204: Control activities of a virtual character in a virtual environment.

A user controls the virtual character to perform activities through the operation control 20, and the user may control the virtual character to perform activities by pressing a button in one or more operation controls 20. The activities include: at least one of walking, running, lying down, jumping, and squatting. This is not limited by this embodiment. The user may also control the virtual character to cast skills or use items by pressing the button in one or more operation controls 20. The user may also control the virtual character through a signal generated by long pressing, clicking/tapping, double clicking/tapping, and/or sliding on a touch screen.

Operation 206*a*: Superimpose a first mask layer between the display layer and the operation layer in response to the virtual character being influenced by a first target event in the virtual environment, and superimpose a first blur effect layer on the information layer, the first mask layer being configured to display all picture contents in the virtual environment picture as a shielded state, and the first blur effect layer being configured to display all information on the map presentation control as a blurred state.

The mask layer is configured to shield the virtual environment picture on the display layer, and the mask layer is between the display layer 56 and the operation layer 54. The first mask layer 551 is a mask layer for masking the entire virtual environment picture 10. The blur effect layer is configured to display the map presentation control on the information layer 52 as the blurred state. The display priority of the blur effect layer is greater than that of the information layer 52, and the first blur effect layer 511 is configured to display the entire map presentation control 30 on the information layer 52 as the blurred state. The size of the blur effect layer is equal to the size of the information layer 52, or the size of the blur effect layer is smaller than the size of the information layer 52.

All the information of the virtual environment picture 10 refers to all picture information covered by a visual field of the virtual character located in the virtual environment. The display of all picture contents in the virtual environment picture 10 as a shielded state refers to that all pictures displayed by the display layer are shielded and covered by the mask layer. That is, all the pictures displayed by the display layer are not visible from the user interface. The display priority of the mask layer is greater than that of the display layer. And in a case that the entire display layer is required to be shielded, the size of the mask layer is the same as the size of the display layer, or the size of the mask layer is greater than the size of the display layer. In a case that the partial display layer is required to be shielded, the size of the mask layer is smaller than the size of the display layer.

The map presentation control 30 may also be referred to as a map or a minimap for presenting, in the two-dimensional or three-dimensional form, the landforms of the virtual environment provided by the game application. The information displayed by the map presentation control 30 includes the landforms of the virtual environment, such as the locations of city R, city P, and ports; or, the location of the virtual character; or, at least one of footstep information, gunshot information, and mechanical sound information. This is not limited herein.

The blurred state of the map presentation control 30 includes full blur and partial blur. In some embodiments, the map presentation control 30 contains n kinds of information. The full blur refers to blur of all the n kinds of information in the map presentation control 30. The partial blur refers to blur of at least one of the information in the map presentation control 30. The n kinds of information include at least two of landform information, location information of the virtual character, footstep information, gunshot information, and mechanical sound information. This is not limited herein.

The partial blur manner of the map presentation control 30 includes endowing the information in the map presentation control 30 with at least two different attributes, selecting a blur effect layer with the same attributes as to-be-blurred information according to the attributes of the to-be-blurred information, and using the blur effect layer to blur the to-be-blurred information. The different attributes may include at least one of a color attribute, a shape attribute, a transparency attribute, and a pattern attribute. This is not limited herein.

Figure 6:
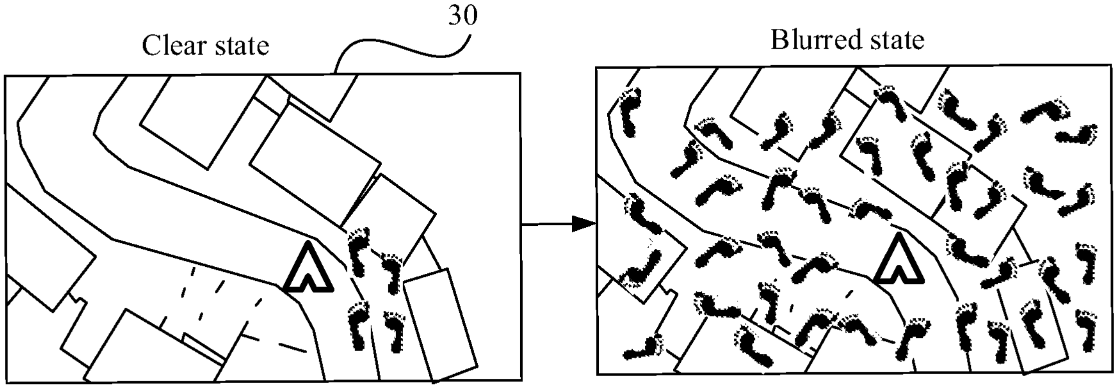
FIG. 6 is a schematic diagram of partially blurred information displayed on an information layer according to some embodiments.

In some embodiments, as shown in FIG. 6, in a case that the footstep information displayed in the map presentation control 30 is required to be blurred, the attribute of the footstep information is a shape attribute, and the footstep information is displayed as a footprint shape in the map presentation control 30. Then, a blur effect layer with the same shape attribute may be selected to blur the map presentation control 30. That is, a plurality of identical footstep shapes are displayed in the blur effect layer so as to blur the footstep information displayed in the map presentation control 30, thereby achieving the partial blur of the displayed information in the map presentation control 30.

In some embodiments, in a case that the road information displayed in the map presentation control 30 is required to be blurred, for example, if the road information displayed in the map presentation control 30 is khaki, a khaki blur effect layer with a certain transparency may be selected to blur the road information displayed in the map presentation control 30, thereby achieving the partial blur of the displayed information in the map presentation control 30.

The mask layer is at least one of a pure color layer, a gradient layer and a picture layer. This is not limited herein. Generally, the mask layer is an opaque layer. For example, the mask layer may be one or more of a white opaque layer, a black opaque layer, and a yellow opaque layer. This is not limited by this embodiment.

The blur effect layer is at least one of a pure color layer, a grid layer, a mosaic layer, and a checkerboard layer. This is not limited by this embodiment. Generally, the blur effect layer is a layer with a certain transparency. For example, the blur effect layer may be one or more of a layer with patterns, a layer with grids, and a layer with colors. This is not limited by this embodiment.

The target event includes at least one of a hit by a prop having a blinding effect and a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event, and may also be understood as that the virtual character in the virtual environment is within a hit range of the flash bomb. The first target event refers to a prop having a scope of influence including the blur effect layer.

First Target Event: an event that the virtual character is hit by a prop having a blinding effect (or a skill having a blinding effect) and the power of the prop having the blinding effect (or the skill having the blinding effect)

reaches a first preset threshold. In some embodiments, the first preset threshold is a preset threshold. When the power of the prop having the blinding effect (or the skill having the blinding effect) reaches the first preset threshold, a first mask layer is superimposed on the display layer, and a first blur effect layer is superimposed on the information layer.

Schematically, in a case that the virtual character is hit by a first prop, the first mask layer 551 is superimposed on the display layer 56 in the user interface. The first blur effect layer 511 is superimposed on the information layer 52.

Schematically, as shown in FIG. 7, in a case that the virtual character is influenced by the first target event in the virtual environment, superimposing locations on the display layer 56 and the information layer 52 are respectively determined according to relative locations of the first target event and the virtual character. The first mask layer 551 is superimposed at the superimposing location between the display layer 56 and the operation layer 54, and the first blur effect layer 511 is superimposed at the superimposing location on the information layer 52.

Schematically, in a case that the virtual character is influenced by the first target event in the virtual environment, namely, the virtual character is within a scope of influence of the first target event, all pictures of the virtual environment picture 10 in the user interface are displayed as a shielded state. The shielded state refers to that it is difficult for the virtual character to obtain information from the virtual environment, namely, it is difficult for a user to obtain information from the virtual environment picture 10 in the user interface. All the information of the map presentation control 30 in the user interface is displayed as a blurred state. The blurred state refers to that the virtual character can only obtain blurred information from map information, and cannot clearly obtain the map information. That is, the user can only obtain blurred information from the map presentation control 30 in the user interface.

In summary, according to the method provided in this embodiment, the user interface is displayed. The activities of the virtual character in the virtual environment are controlled. In a case that the virtual character is influenced by the first target event in the virtual environment, the first mask layer 551 is superimposed between the display layer 56 and the operation layer 54, and the first blur effect layer 511 is superimposed on the information layer 52. All the picture contents in the virtual environment picture are displayed as the shielded state, and all the information on the map presentation control is displayed as the blurred state. After the virtual character is influenced by the first target event, the entire virtual environment picture in the shielded state and the entire map presentation control in the blurred state actually show the blinding effect of the virtual character under the influence of the first target event.

Figure 8:
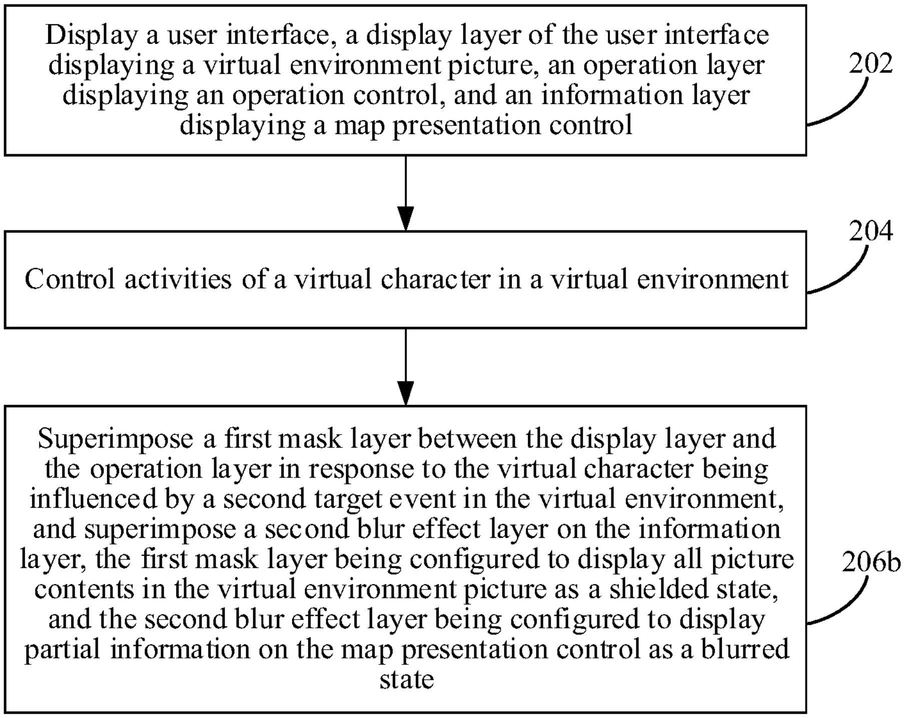
FIG. 8 is a flowchart of a user interface display method according to some embodiments.

FIG. 8 is a flowchart of a user interface display method according to some embodiments. The method may be performed by a terminal or a client on the terminal in a system as shown in FIG. 2. The method includes the following operations:

Operation 202: Display a user interface, a display layer of the user interface displaying a virtual environment picture, an operation layer displaying an operation control, and an information layer displaying a map presentation control.

The user interface is an interface for displaying a virtual environment picture 10, an operation control 20 and a map presentation control 30. The virtual environment picture 10 is used for displaying picture information covered by a visual field of a virtual character located in a virtual environment, and includes at least one of a house, a vehicle, a tree, a river, and a bridge. This is not limited by this embodiment. The operation control 20 is configured to control the virtual character to execute a certain behavior action. The map presentation control 30 is configured to present a map of the virtual environment.

Figure 9:
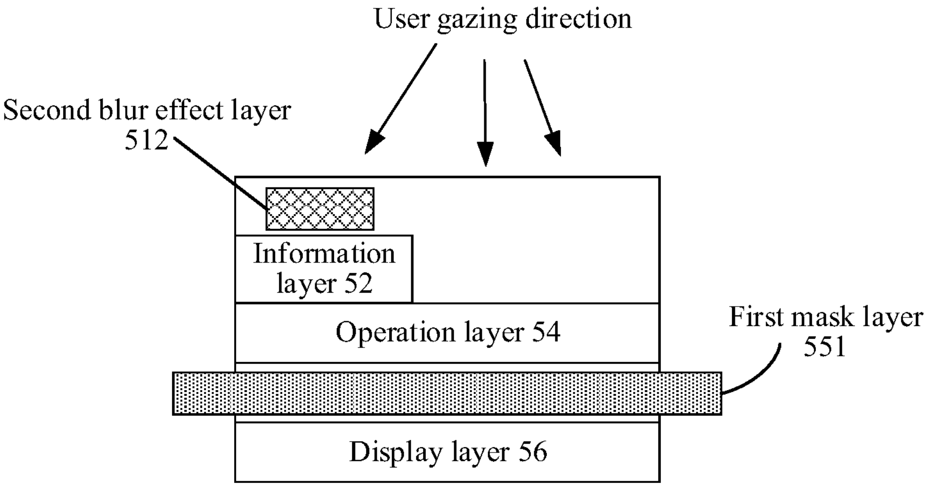
FIG. 9 is a schematic diagram of a user interface display structure according to some embodiments.

Referring to FIG. 9, the user interface includes a display layer 56, an operation layer 54 and an information layer 52. The display layer 56 is configured to display the virtual environment picture 10, the operation layer 54 is configured to display the operation control 20, and the display priority of the operation layer 54 is greater than that of the display layer 56. The information layer 52 is configured to display the map presentation control, and the display priority of the information layer 52 is greater than that of the operation layer 54.

Operation 204: Control activities of a virtual character in a virtual environment.

A user controls the virtual character to perform activities through the operation control 20, and the user may control the virtual character to perform activities by pressing a button in one or more operation controls 20. The activities include: at least one of walking, running, lying down, jumping, and squatting. This is not limited by this embodiment. The user may also control the virtual character to cast skills or use items by pressing the button in one or more operation controls 20. The user may also control the virtual character through a signal generated by long pressing, clicking/tapping, double clicking/tapping, and/or sliding on a touch screen.

Operation 206*b*: Superimpose a first mask layer between the display layer and the operation layer in response to the virtual character being influenced by a second target event in the virtual environment, and superimpose a second blur effect layer on the information layer, the first mask layer being configured to display all picture contents in the virtual environment picture as a shielded state, and the second blur effect layer being configured to display partial information on the map presentation control as a blurred state.

The mask layer is configured to shield the virtual environment picture on the display layer, and the mask layer is between the display layer 56 and the operation layer 54. The first mask layer 551 is a mask layer for masking the entire virtual environment picture. The blur effect layer is configured to display the map presentation control on the information layer as the blurred state. The display priority of the blur effect layer is greater than that of the information layer 52. The first blur effect layer 511 is configured to display the entire map presentation control 30 on the information layer 52 as the blurred state. The second blur effect layer 512 is configured to display the partial map presentation control 30 on the information layer 52 as the blurred state. The blur effect of the second blur effect layer 512 is weaker than that of the first blur effect layer 511. That is, in a case that the partial information on the map presentation controls 30 is displayed as the blurred state, the clarity of the map presentation control information obtained by a user through the information layer on the user interface is better than information obtained when all the information on the map presentation control 30 is displayed as the blurred state.

The map presentation control 30 may also be referred to as a map or a minimap for presenting, in the two-dimensional or three-dimensional form, the landforms of the virtual environment provided by the game application. The information displayed by the map presentation control 30 includes the landforms of the virtual environment, such as the locations of city R, city P, and ports; or, the location of the virtual character; or, at least one of footstep information, gunshot information, and mechanical sound information. This is not limited herein.

The blurred state of the map presentation control 30 includes full blur and partial blur. In some embodiments, the map presentation control 30 contains n kinds of information. The full blur refers to blur of all the n kinds of information in the map presentation control 30. The partial blur refers to blur of at least one of the information in the map presentation control 30. The n kinds of information include at least two of landform information, location information of the virtual character, footstep information, gunshot information, and mechanical sound information. This is not limited herein.

The mask layer is at least one of a pure color layer, a gradient layer and a picture layer. This is not limited herein. In some embodiments, a pure color layer is used as the mask layer. The mask layer may be one or more of white, black and yellow. This is not limited by this embodiment.

The blur effect layer is at least one of a pure color layer, a grid layer, a mosaic layer, and a checkerboard layer. This is not limited by this embodiment.

The target event includes at least one of a hit by a prop having a blinding effect or a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event. The second target event refers to a prop having a scope of influence including the information layer 52 but not including the blur effect layer.

Second Target Event: an event that the virtual character is hit by a prop having a blinding effect (or a skill having a blinding effect) and the power of the prop having the blinding effect (or the skill having the blinding effect) reaches a second preset threshold. In some embodiments, the second preset threshold is a preset threshold. When the power of the prop having the blinding effect (or the skill having the blinding effect) reaches the second preset threshold, a first mask layer is superimposed on the display layer, and a second blur effect layer is superimposed on the information layer.

Schematically, as shown in FIG. 9, in a case that the virtual character is influenced by the second target event in the virtual environment, superimposing locations on the display layer 56 and the information layer 52 are respectively determined according to relative locations of the second target event and the virtual character. The first mask layer 551 is superimposed at the superimposing location between the display layer 56 and the operation layer 54, and the second blur effect layer 512 is superimposed at the superimposing location on the information layer 52.

Schematically, in a case that the virtual character is influenced by the second target event in the virtual environment, namely, the virtual character is within a scope of influence of the second target event, all pictures of the virtual environment picture in the user interface are displayed as a shielded state. The shielded state refers to that it is difficult for the virtual character to obtain information from the virtual environment, namely, it is difficult for a user to obtain information from the virtual environment picture in the user interface. The partial information of the map presentation control in the user interface is displayed as a blurred state. The blurred state refers to that the virtual character can only obtain blurred information from map information, and cannot clearly obtain the map information. That is, the user can only obtain blurred information from the map presentation control in the user interface.

In summary, according to the method provided in this embodiment, the user interface is displayed. The activities of the virtual character in the virtual environment are controlled. In a case that the virtual character is influenced by the second target event in the virtual environment, the first mask layer 551 is superimposed between the display layer 56 and the operation layer 54, and the second blur effect layer 512 is superimposed on the information layer 52. All the picture contents in the virtual environment picture are displayed as the shielded state, and the partial information on the map presentation control 30 is displayed as the blurred state. After the virtual character is influenced by the second target event, the entire virtual environment picture 10 in the shielded state and the partial map presentation control 30 in the blurred state actually show the blinding effect of the virtual character under the influence of the second target event.

Figure 10:
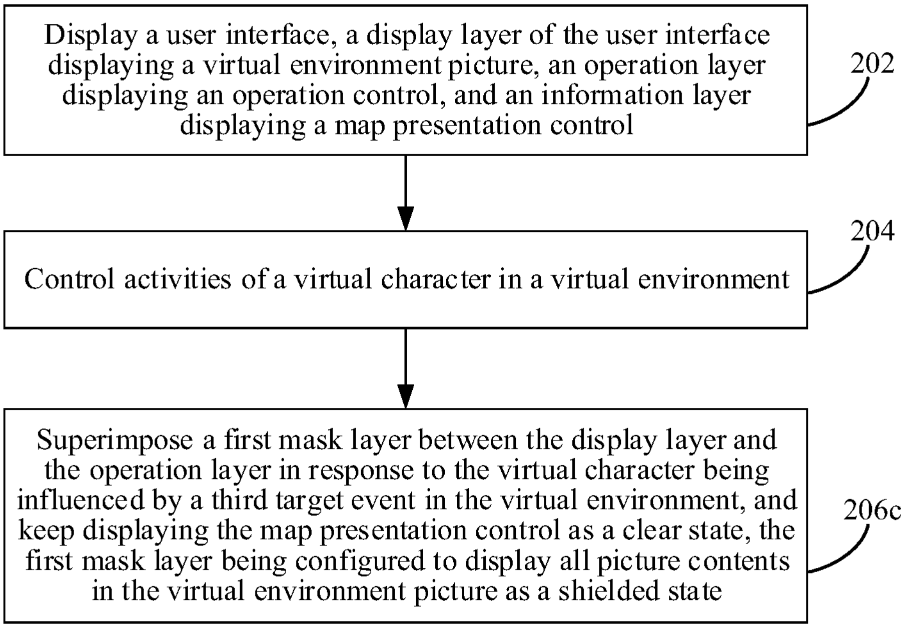
FIG. 10 is a flowchart of a user interface display method according to some embodiments.

FIG. 10 is a flowchart of a user interface display method according to some embodiments. The method may be performed by a terminal or a client on the terminal in a system as shown in FIG. 2. The method includes the following operations:

Operation 202: Display a user interface, a display layer of the user interface displaying a virtual environment picture, an operation layer displaying an operation control, and an information layer displaying a map presentation control.

The user interface is an interface for displaying a virtual environment picture 10, an operation control 20 and a map presentation control 30. The virtual environment picture 10 is used for displaying picture information covered by a visual field of a virtual character located in a virtual environment, and includes at least one of a house, a vehicle, a tree, a river, and a bridge. This is not limited by this embodiment. The operation control 20 is configured to control the virtual character to execute a certain behavior action. The map presentation control 30 is configured to present a map of the virtual environment.

Figure 11:
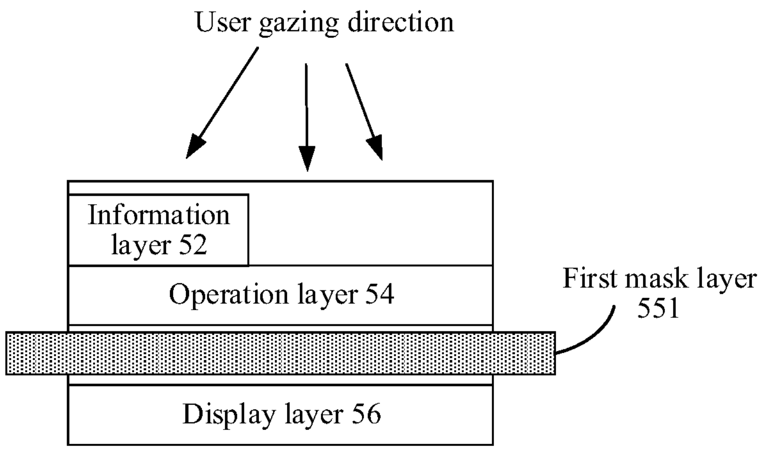
FIG. 11 is a schematic diagram of a user interface display structure according to some embodiments.

Referring to FIG. 11, the user interface includes a display layer 56, an operation layer 54 and an information layer 52. The display layer 56 is configured to display the virtual environment picture 10, the operation layer 54 is configured to display the operation control 20, and the display priority of the operation layer 54 is greater than that of the display layer 56. The information layer 52 is configured to display the map presentation control, and the display priority of the information layer 52 is greater than that of the operation layer 54.

Operation 204: Control activities of a virtual character in a virtual environment.

A user controls the virtual character to perform activities through the operation control 20, and the user may control the virtual character to perform activities by pressing a button in one or more operation controls 20. The activities include: at least one of walking, running, lying down, jumping, and squatting. This is not limited by this embodiment. The user may also control the virtual character to cast skills or use items by pressing the button in one or more operation controls 20. The user may also control the virtual character through a signal generated by long pressing, clicking/tapping, double clicking/tapping, and/or sliding on a touch screen.

Operation 206*c*: Superimpose a first mask layer between the display layer and the operation layer in response to the virtual character being influenced by a third target event in the virtual environment, and keep displaying the map presentation control as a clear state, the first mask layer being configured to display all picture contents in the virtual environment picture as a shielded state.

The mask layer is configured to shield the virtual environment picture on the display layer, and the mask layer is between the display layer 56 and the operation layer 54. The first mask layer 551 is a mask layer for masking the entire virtual environment picture 10.

The target event includes at least one of a hit by a prop having a blinding effect and a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event, and may also be understood as that the virtual character in the virtual environment is within a hit range of the flash bomb. The third target event refers to a prop having a scope of influence including the mask layer but not including the information layer.

Third Target Event: an event that the virtual character is hit by a prop having a blinding effect (or a skill having a blinding effect) and the power of the prop having the blinding effect (or the skill having the blinding effect) reaches a third preset threshold. In some embodiments, the third preset threshold is a preset threshold. When the power of the prop having the blinding effect (or the skill having the blinding effect) reaches the third preset threshold, a first mask layer is superimposed on the display layer.

Schematically, as shown in FIG. 11, in a case that the virtual character is influenced by the third target event in the virtual environment, a superimposing location on the display layer 56 is determined according to relative locations of the third target event and the virtual character. The first mask layer 551 is superimposed at the superimposing location between the display layer 56 and the operation layer 54, and the map presentation control 30 on the information layer 52 is presented in a clear state.

All the information of the virtual environment picture 10 refers to all picture information covered by a visual field of the virtual character located in the virtual environment. The display of all picture contents in the virtual environment picture 10 as a shielded state refers to that all pictures displayed by the display layer are shielded and covered by the mask layer. That is, all the pictures displayed by the display layer are not visible from the user interface. The display priority of the mask layer is greater than that of the display layer. And in a case that the entire display layer is required to be shielded, the size of the mask layer is the same as the size of the display layer, or the size of the mask layer is greater than the size of the display layer. In a case that the partial display layer is required to be shielded, the size of the mask layer is smaller than the size of the display layer.

The mask layer is at least one of a pure color layer, a gradient layer and a picture layer. This is not limited herein. In this embodiment, a pure color layer is used as the mask layer. The mask layer may be one or more of white, black and yellow. This is not limited by this embodiment.

Schematically, in a case that the virtual character is influenced by the third target event in the virtual environment, namely, the virtual character is within a scope of influence of the third target event, all pictures of the virtual environment picture 10 in the user interface are displayed as a shielded state. The shielded state refers to that it is difficult for the virtual character to obtain information from the virtual environment, namely, it is difficult for a user to obtain information from the virtual environment picture 10 in the user interface. The map presentation control 30 in the user interface is displayed as a clear state, namely, the user can only clearly obtain map information from the map presentation control in the user interface.

In summary, according to the method provided in this embodiment, the user interface is displayed. The activities of the virtual character in the virtual environment are controlled. In a case that the virtual character is influenced by the third target event in the virtual environment, only the first mask layer 551 is superimposed between the display layer 56 and the operation layer 54. All the picture contents in the virtual environment picture are displayed as the shielded state, and the information on the map presentation control is displayed as the clear state. After the virtual character is influenced by the third target event, the entire virtual environment picture in the shielded state and the map presentation control in the clear state actually show the blinding effect of the virtual character under the influence of the third target event.

Figure 12:
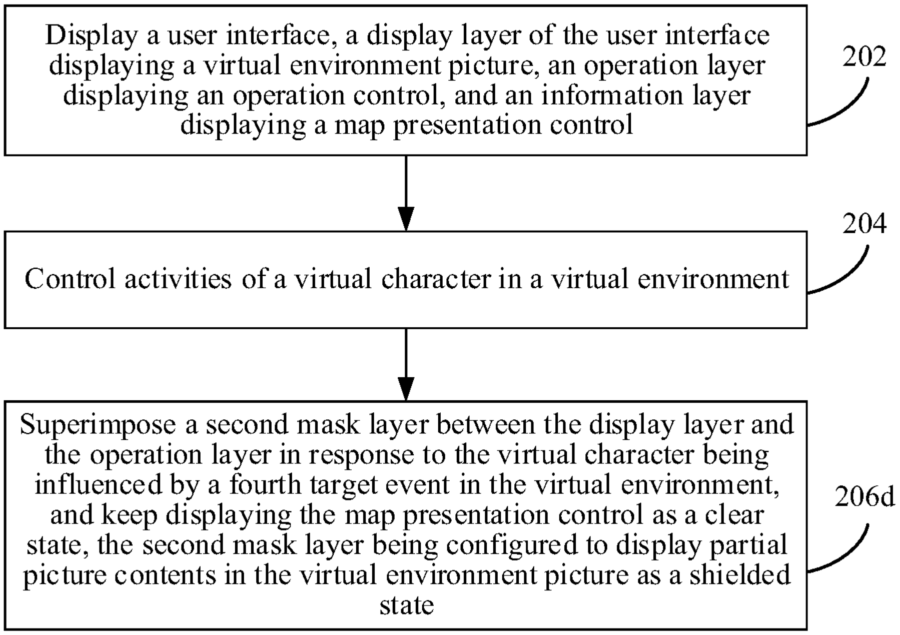
FIG. 12 is a flowchart of a user interface display method according to some embodiments.

FIG. 12 is a flowchart of a user interface display method according to some embodiments. The method may be performed by a terminal or a client on the terminal in a system as shown in FIG. 2. The method includes the following operations:

Operation 202: Display a user interface, a display layer of the user interface displaying a virtual environment picture, an operation layer displaying an operation control, and an information layer displaying a map presentation control.

The user interface is an interface for displaying a virtual environment picture 10, an operation control 20 and a map presentation control 30. The virtual environment picture 10 is used for displaying picture information covered by a visual field of a virtual character located in a virtual environment, and includes at least one of a house, a vehicle, a tree, a river, and a bridge. This is not limited by this embodiment. The operation control 20 is configured to control the virtual character to execute a certain behavior action. The map presentation control 30 is configured to present a map of the virtual environment.

Figure 13:
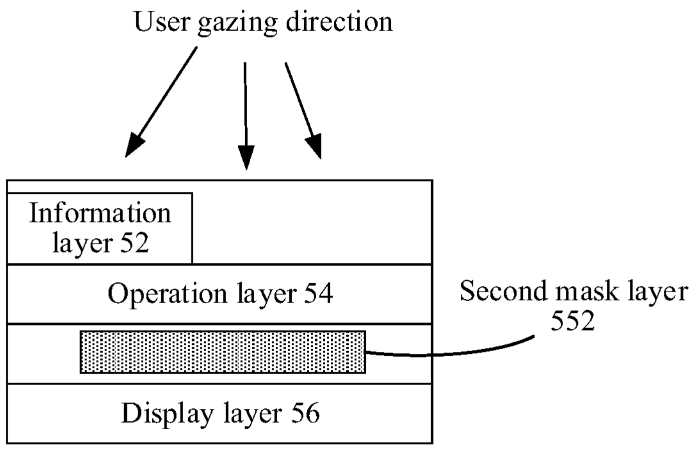
FIG. 13 is a schematic diagram of a user interface display structure according to some embodiments.

Referring to FIG. 13, the user interface includes a display layer 56, an operation layer 54 and an information layer 52. The display layer 56 is configured to display the virtual environment picture 10, the operation layer 54 is configured to display the operation control 20, and the display priority of the operation layer 54 is greater than that of the display layer 56. The information layer 52 is configured to display the map presentation control, and the display priority of the information layer 52 is greater than that of the operation layer 54.

Operation 204: Control activities of a virtual character in a virtual environment.

A user controls the virtual character to perform activities through the operation control 20, and the user may control the virtual character to perform activities by pressing a button in one or more operation controls 20. The activities include: at least one of walking, running, lying down, jumping, and squatting. This is not limited by this embodiment. The user may also control the virtual character to cast skills or use items by pressing the button in one or more operation controls 20. The user may also control the virtual character through a signal generated by long pressing, clicking/tapping, double clicking/tapping, and/or sliding on a touch screen.

Operation 206*d*: Superimpose a second mask layer between the display layer and the operation layer in response to the virtual character being influenced by a fourth target event in the virtual environment, and keep displaying the map presentation control as a clear state, the second mask layer being configured to display partial picture contents in the virtual environment picture as a shielded state.

The mask layer is configured to shield the virtual environment picture on the display layer, and the mask layer is between the display layer 56 and the operation layer 54. The second mask layer 552 is a mask layer for masking the partial virtual environment picture.

The target event includes at least one of a hit by a prop having a blinding effect and a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event, and may also be understood as that the virtual character in the virtual environment is within a hit range of the flash bomb. The fourth target event refers to a prop having a scope of influence including the display layer 56 but not including the mask layer.

Fourth Target Event: an event that the virtual character is hit by a prop having a blinding effect (or a skill having a blinding effect) and the power of the prop having the blinding effect (or the skill having the blinding effect) reaches a fourth preset threshold. In some embodiments, the fourth preset threshold is a preset threshold. When the power of the prop having the blinding effect (or the skill having the blinding effect) reaches the fourth preset threshold, a second mask layer is superimposed on the display layer.

Schematically, as shown in FIG. 13, in a case that the virtual character is influenced by the fourth target event in the virtual environment, a superimposing location on the display layer 56 is determined according to relative locations of the fourth target event and the virtual character. The second mask layer 552 is superimposed at the superimposing location between the display layer 56 and the operation layer 54, and the map presentation control is clearly displayed on the information layer 52.

Schematically, in a case that the virtual character is influenced by the fourth target event in the virtual environment, namely, the virtual character is within a scope of influence of the fourth target event, partial pictures of the virtual environment picture in the user interface are displayed as a shielded state. The map presentation control in the user interface is displayed as a clear state.

Figure 14:
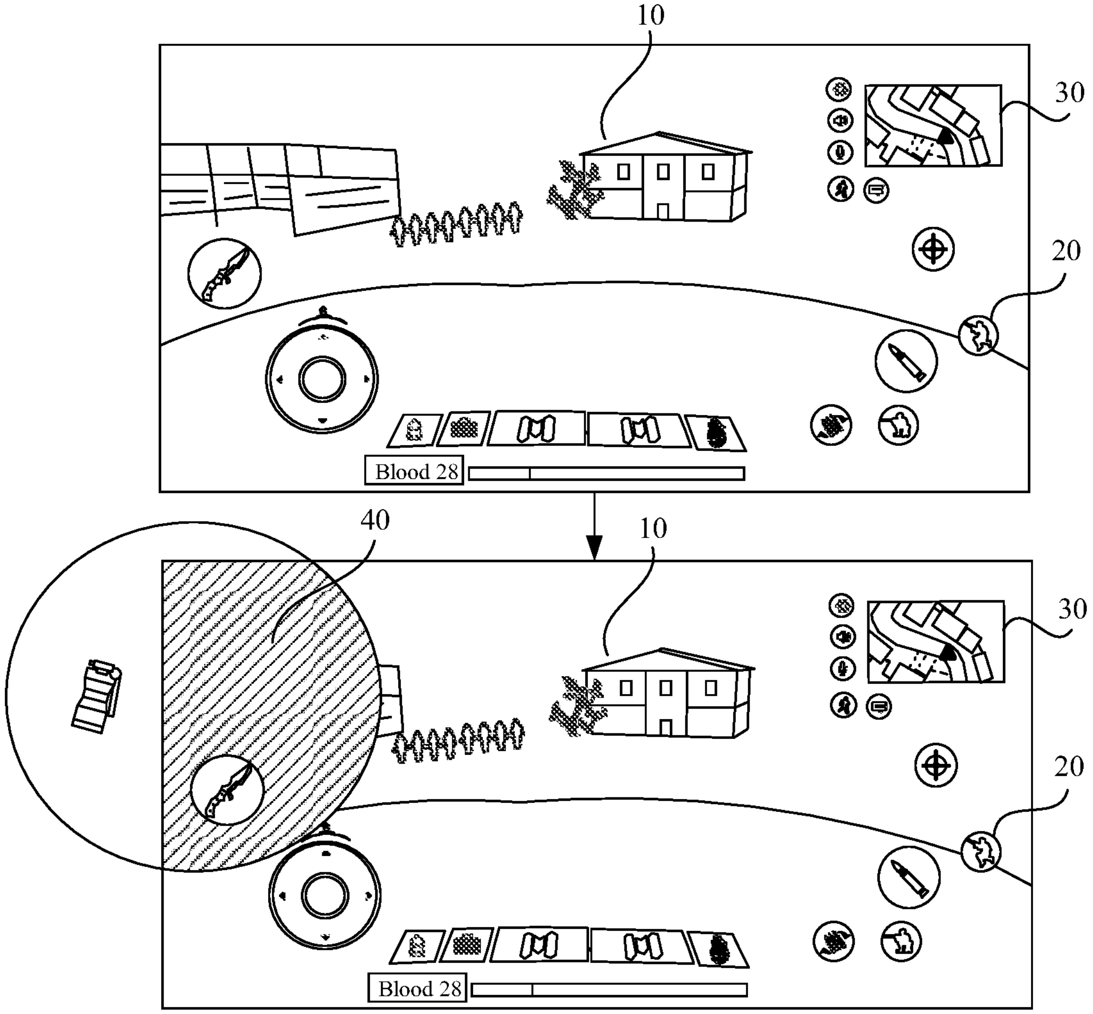
FIG. 14 is a schematic diagram of an overlap region of a target event and a display layer according to some embodiments.

In some embodiments, as shown in FIG. 14, the partial information of the virtual environment picture 10 refers to a region where all the picture information covered by a visual field of the virtual character located in the virtual environment overlaps with the scope of influence of the fourth target event. According to the relative locations of the fourth target event and the virtual character, a superimposing location on the display layer 56, namely, an overlap region 40 between all the picture information and the scope of influence of the fourth target event, is determined. The second mask layer 552 is superimposed at the superimposing location on the display layer 56. Herein, the size of the second mask layer 552 is the same as the size of the overlap region 40 shown in FIG. 14.

In summary, according to the method provided in this embodiment, the user interface is displayed. The activities of the virtual character in the virtual environment are controlled. In a case that the virtual character is influenced by the fourth target event in the virtual environment, only the second mask layer 552 is superimposed between the display layer 56 and the operation layer 54. The partial picture contents in the virtual environment picture are displayed as the shielded state, and the information on the map presentation control is displayed as the clear state. After the virtual character is influenced by the fourth target event, the partial virtual environment picture in the shielded state and the map presentation control in the clear state actually show the blinding effect of the virtual character under the influence of the fourth target event.

Figure 15:
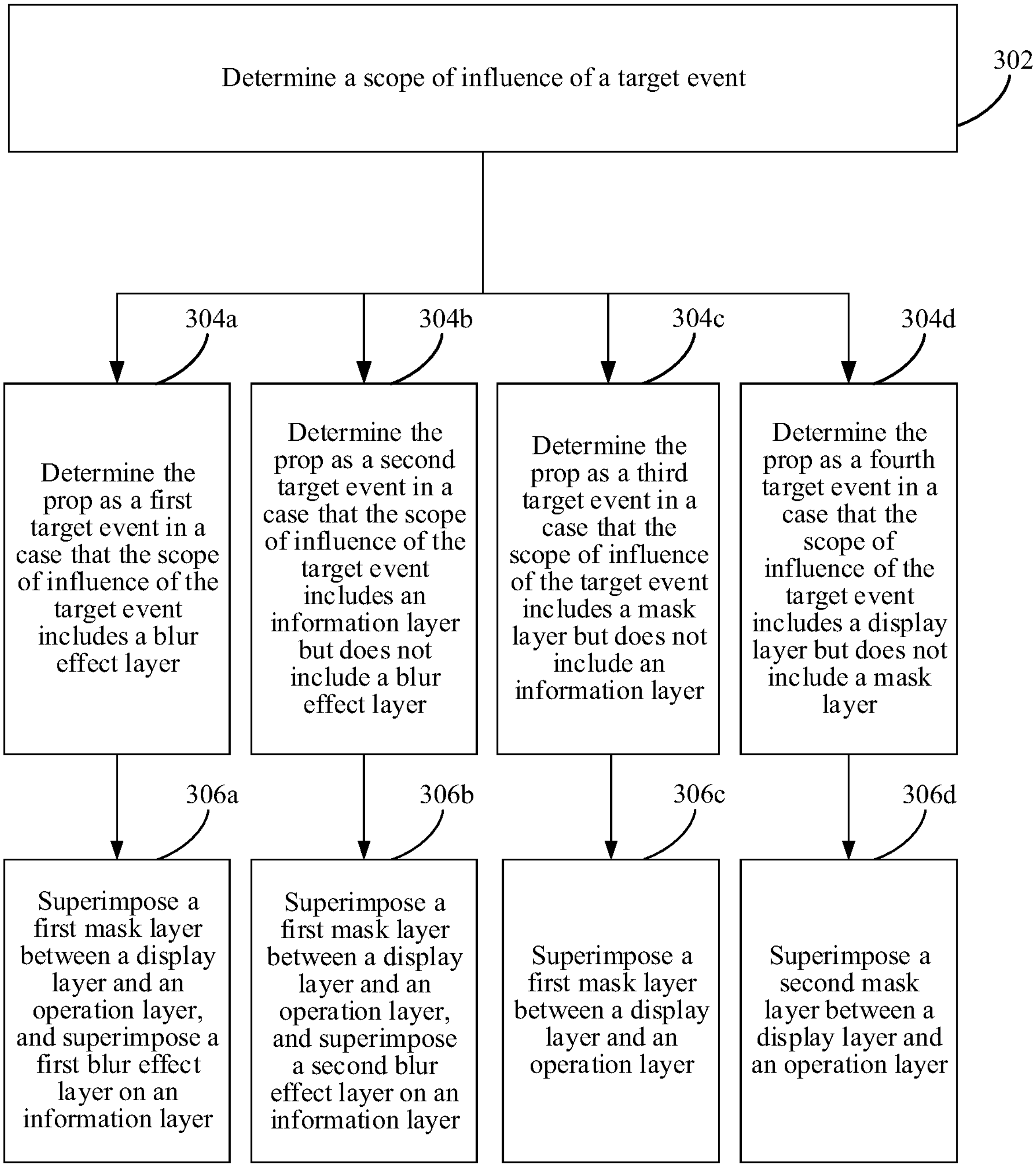
FIG. 15 is a flowchart of a user interface display method according to some embodiments.

FIG. 15 is a flowchart of a user interface display method according to some embodiments. The method may be performed by a terminal or a client on the terminal in a system as shown in FIG. 2. The method includes the following operations:

Operation 302: Determine a scope of influence of a target event.

The target event includes at least one of a hit by a prop having a blinding effect and a hit by a skill having a blinding effect. This is not limited by this embodiment. For example, the prop having the blinding effect may be a flash bomb. This is not limited by this embodiment. The influence by the target event means that the location of the virtual character in the virtual environment is within the scope of influence of the target event.

Operation 304*a*: Determine the prop as a first target event in a case that the scope of influence of the target event includes a blur effect layer.

The prop is determined as the first target event in a case that the scope of influence of the target event includes the blur effect layer.

Operation 306*a*: Superimpose a first mask layer between a display layer and an operation layer, and superimpose a first blur effect layer on an information layer.

Referring to FIG. 7, in a case that the target event is determined as the first target event, the first mask layer 551 is superimposed at the superimposing location between the display layer 56 and the operation layer 54, and the first blur effect layer 511 is superimposed at the superimposing location on the information layer 52.

Operation 304*b*: Determine the prop as a second target event in a case that the scope of influence of the target event includes an information layer but does not include a blur effect layer.

The prop is determined as the second target event in a case that the scope of influence of the target event includes the information layer but does not include the blur effect layer.

Operation 306*b*: Superimpose a first mask layer between a display layer and an operation layer, and superimpose a second blur effect layer on an information layer.

Referring to FIG. 9, in a case that the target event is determined as the second target event, the first mask layer 551 is superimposed at the superimposing location between the display layer 56 and the operation layer 54, and the second blur effect layer 512 is superimposed at the superimposing location on the information layer 52.

Operation 304*c*: Determine the prop as a third target event in a case that the scope of influence of the target event includes a mask layer but does not include an information layer.

The prop is determined as the third target event in a case that the scope of influence of the target event includes the mask layer but does not include the information layer.

Operation 306*c*: Superimpose a first mask layer between a display layer and an operation layer.

Referring to FIG. 11, in a case that the target event is determined as the third target event, the first mask layer 551 is superimposed at the superimposing location between the display layer 56 and the operation layer 54.

Operation 304*d*: Determine the prop as a fourth target event in a case that the scope of influence of the target event includes a mask layer but does not include an information layer.

The prop is determined as the fourth target event in a case that the scope of influence of the target event includes the display layer but does not include the mask layer.

Operation 306*d*: Superimpose a second mask layer between a display layer and an operation layer.

Referring to FIG. 13, in a case that the target event is determined as the fourth target event, the second mask layer 552 is superimposed at the superimposing location between the display layer 56 and the operation layer 54.

In some embodiments, based on the optional embodiment shown in FIG. 2, operation 206 may be replaced with "displaying, in response to the virtual character being influenced by a visual interference event in the virtual environment, the virtual environment picture as the shielded state and landforms presented by the map presentation control as the blurred state; and displaying a sound event icon in a clear state on the map presentation control in response to the virtual character being influenced by a sound event in the virtual environment during the visual interference event".

The visual interference event is that the virtual character is in a hit range of a visual interference prop (flash bomb) or a visual interference skill (for example, a skill of temporarily losing a visual field) in the virtual environment.

The sound event is an event in which the virtual character obtains a sound emitted within a corresponding hearing range, such as a footstep sound or a shooting sound of a virtual gun.

In some embodiments, in response to the virtual character being in the hit range of the flash bomb in the virtual environment, the virtual environment picture on the user interface is displayed as the shielded state, and the landforms presented by the map presentation control on the user interface are displayed as the blurred state. Assuming that the virtual character obtains the footstep sound of an enemy nearby during the action of the flash bomb, a footstep icon in a clear state is displayed on the map presentation control.

In an embodiment, the virtual environment picture is at a display layer, the map presentation control is at an information layer, and the information layer is higher than the display layer. A mask layer is superimposed on the display layer and a blur effect layer is superimposed on the information layer in response to the virtual character being influenced by the visual interference event in the virtual environment. A clear effect layer is superimposed on the information layer in response to the virtual character being influenced by the sound event in the virtual environment during the visual interference event. The clear effect layer is only configured to display the sound event icon in the clear state.

In some embodiments, in response to the virtual character being in the hit range of the flash bomb in the virtual environment, the mask layer is superimposed on the display layer, and the blur effect layer is superimposed on the information layer. The blur effect layer is configured to blur all information on the information layer. Assuming that the virtual character obtains the footstep sound of an enemy nearby during the action of the flash bomb, the clear effect layer is superimposed on the information layer. The clear effect layer is configured to clarify the sound event icon on the information layer.

In summary, the target event is further subdivided into a visual interference event and a sound event, only the landforms corresponding to the visual interference event are blurred, and a sound icon corresponding to the sound event is not blurred, thereby further providing a more real blinding effect. A player will only retain a blurred map memory under the influence of the visual interference event, but the orientation perception caused by the sound event is not influenced by the visual interference event.

Figure 16:
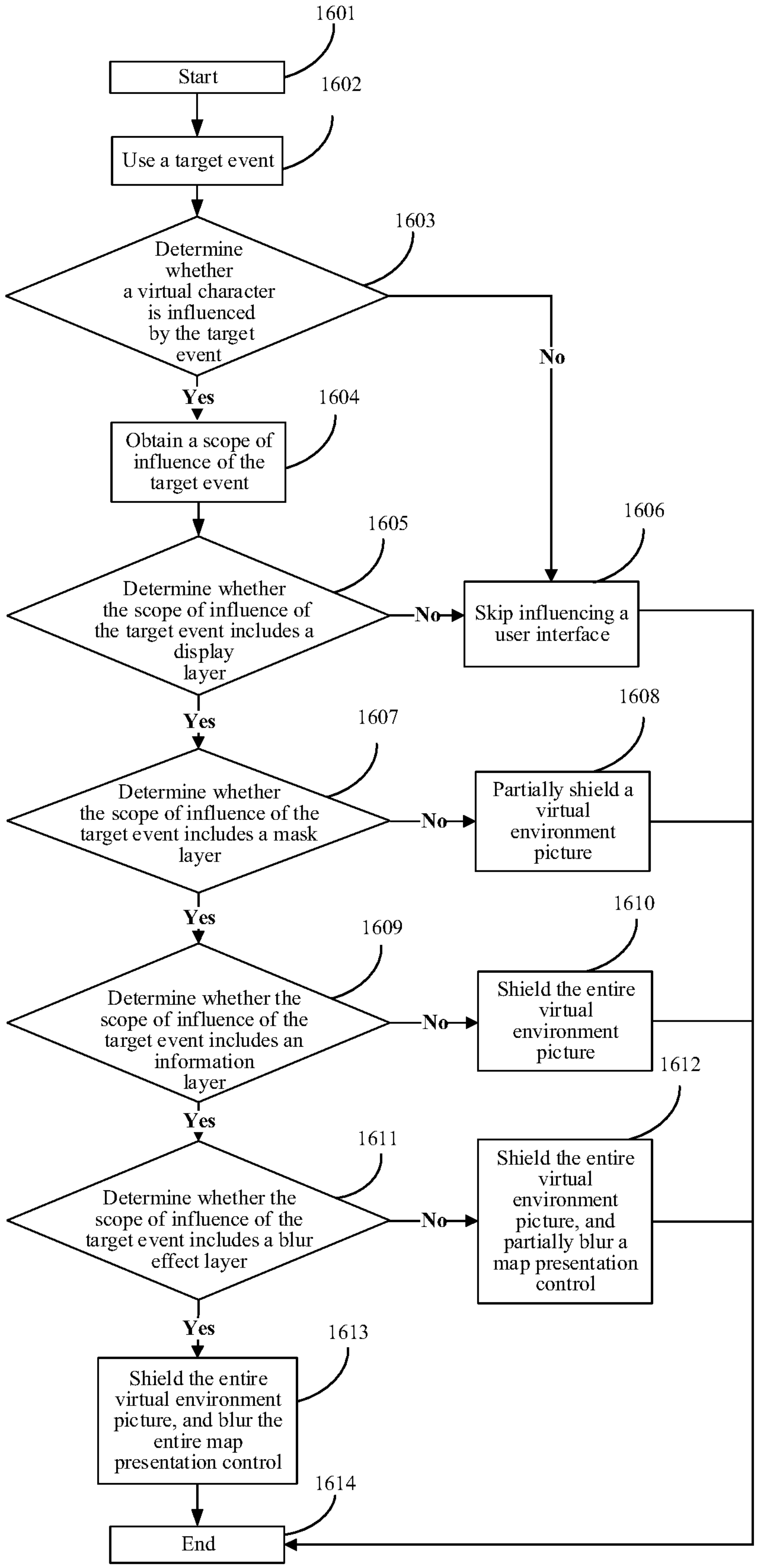
FIG. 16 is a flowchart of a user interface display method according to some embodiments.

FIG. 16 is a flowchart of a user interface display method according to some embodiments. The method may be performed by a terminal or a client on the terminal in a system as shown in FIG. 2. The method includes the following operations:

Operation 1601: Start.

Operation 1602: Use a target event.

The target event includes at least one of a hit by a prop having a blinding effect or a hit by a skill having a blinding effect. This is not limited by this embodiment. For example, the prop having the blinding effect may be a flash bomb. This is not limited by this embodiment. The use of the target event may be any virtual character in a virtual environment. This is not limited by this embodiment.

Operation 1603: Determine whether a virtual character is influenced by the target event.

In some embodiments, it is determined whether the virtual character is influenced by the target event. That is, it is determined whether the virtual character is within a scope of influence of the target event. If the virtual character is within the scope of influence of the target event, the virtual character is influenced by the target event, and operation 1604 is performed. If the virtual character is not within the scope of influence of the target event, the virtual character is not influenced by the target event, and operation 1606 is performed.

Operation 1604: Obtain a scope of influence of the target event.

In some embodiments, in a case that the virtual character is influenced by the target event, the scope of influence of the target event is obtained. The degree of influence of the target event on the virtual character is determined according to the scope of influence of the target event, and operation 1605 is performed.

Operation 1605: Determine whether the scope of influence of the target event includes a display layer.

In some embodiments, in a case that the scope of influence of the target event is obtained, it is determined whether the scope of influence of the target event includes the display layer. The display layer is configured to display a virtual environment interface. In a case that the scope of influence of the target event does not include the display layer, operation 1606 is performed. In a case that the scope of influence of the target event includes the display layer, operation 1607 is performed.

Operation 1606: Skip influencing a user interface.

In some embodiments, in a case that the scope of influence of the target event does not include the display layer, the display layer may normally display the virtual environment interface without a change in the information obtained by the user from the user interface.

Operation 1607: Determine whether the scope of influence of the target event includes a mask layer.

In some embodiments, in a case that the scope of influence of the target event includes the display layer, it is further determined whether the scope of influence of the target event includes the mask layer. The mask layer is located between the display layer and the information layer. In a case that the scope of influence of the target event includes the mask layer, operation 1609 is performed. In a case that the scope of influence of the target event does not include the mask layer, operation 1608 is performed.

Operation 1608: Partially shield a virtual environment picture.

In some embodiments, in a case that the scope of influence of the target event does not include the mask layer, only the partial virtual environment picture of the display layer is displayed as a shielded state according to the scope of influence of the target event. A map presentation control of the information layer is displayed as a clear state.

Operation 1609: Determine whether the scope of influence of the target event includes an information layer.

In some embodiments, in a case that the scope of influence of the target event includes the mask layer, it is further determined whether the scope of influence of the target event includes the information layer. In a case that the scope of influence of the target event includes the information layer, operation 1611 is performed. In a case that the scope of influence of the target event does not include the information layer, operation 1610 is performed.

Operation 1610: Shield the entire virtual environment picture.

In some embodiments, in a case that the scope of influence of the target event includes the mask layer but does not include the information layer, all picture contents in the virtual environment picture of the display layer are displayed as a shielded state. The map presentation control of the information layer is displayed as a clear state.

Operation 1611: Determine whether the scope of influence of the target event includes a blur effect layer.

In some embodiments, in a case that the scope of influence of the target event includes the mask layer and the information layer, it is further determined whether the scope of influence of the target event includes the blur effect layer. In a case that the scope of influence of the target event includes the blur effect layer, operation 1613 is performed. In a case that the scope of influence of the target event does not include the blur effect layer, operation 1612 is performed.

Operation 1612: Shield the entire virtual environment picture, and partially blur a map presentation control.

In some embodiments, in a case that the scope of influence of the target event includes the information layer but does not include the blur effect layer, all picture contents in the virtual environment picture of the display layer are displayed as a shielded state. The partial map presentation control of the information layer is displayed as a blurred state.

Operation 1613: Shield the entire virtual environment picture, and blur the entire map presentation control.

In some embodiments, in a case that the scope of influence of the target event includes the information layer and the blur effect layer, all picture contents in the virtual environment picture of the display layer are displayed as a shielded state. The entire map presentation control of the information layer is displayed as a blurred state.

Operation 1614: End.

Figure 17:
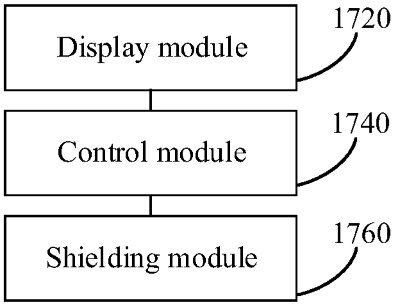
FIG. 17 is a block diagram of a user interface display apparatus according to some embodiments.

FIG. 17 shows a schematic structural diagram of a user interface display apparatus according to some embodiments. The apparatus may be implemented in software, hardware or a combination of both as all or part of a computer device. The apparatus includes:

a display module 1720, configured to display a user interface, the user interface including a virtual environment picture, an operation control and a map presentation control, the virtual environment picture displaying a picture observed to a virtual environment from a perspective determined based on a virtual character, the operation control being configured to control the virtual character, and the map presentation control being configured to present a thumbnail of a virtual world in which the virtual character is located;

a control module 1740, configured to control activities of the virtual character in the virtual environment; and a shielding module 1760, configured to display, in response to the virtual character being influenced by a target event in the virtual environment, the virtual environment picture as a shielded state and the map presentation control as a blurred state.

In some embodiments, the shielding module 1760 is further configured to display, in response to the virtual character being influenced by a first target event in the virtual environment, all picture contents in the virtual environment picture as the shielded state and all information on the map presentation control as the blurred state.

In some embodiments, the shielding module 1760 is further configured to display, in response to the virtual character being influenced by a second target event in the virtual environment, all picture contents in the virtual environment picture as the shielded state and partial information on the map presentation control as the blurred state.

In some embodiments, the shielding module 1760 is further configured to superimpose a first mask layer on the display layer and a first blur effect layer on the information layer in response to the virtual character being influenced by the first target event in the virtual environment.

In some embodiments, the shielding module 1760 is further configured to superimpose the first mask layer on the display layer and a second blur effect layer on the information layer in response to the virtual character being influenced by the second target event in the virtual environment.

In some embodiments, the first mask layer is a mask layer for masking all virtual environment pictures, the first mask layer is lower than the information layer, and a blur effect of the first blur effect layer is stronger than a blur effect of the second blur effect layer.

In some embodiments, the user interface further includes: an operation control. The operation control is configured to control activities of the virtual character in the virtual environment. In some embodiments, the display module 1720 is further configured to keep displaying the operation control on the user interface.

In some embodiments, the shielding module 1760 is further configured to superimpose a first mask layer between the display layer and the operation layer.

In some embodiments, the shielding module 1760 is configured to display, in response to the virtual character being influenced by a third target event in the virtual environment, all picture contents in the virtual environment picture as the shielded state and keep displaying the map presentation control as a clear state.

In some embodiments, the shielding module 1760 is configured to display, in response to the virtual character being influenced by a fourth target event in the virtual environment, partial picture contents in the virtual environment picture as the shielded state and keep displaying the map presentation control as the clear state.

In some embodiments, the virtual environment picture is at a display layer, the map presentation control is at an information layer, and the information layer is higher than the display layer. The shielding module 1760 is further configured to superimpose a first mask layer on the display layer in response to the virtual character being influenced by the third target event in the virtual environment.

In some embodiments, the shielding module 1760 is further configured to superimpose a second mask layer on the display layer in response to the virtual character being influenced by the fourth target event in the virtual environment. In some embodiments, the first mask layer is a mask layer for masking the entire virtual environment picture, the second mask layer is a mask layer for masking the partial virtual environment picture, and the first mask layer and the second mask layer are both lower than the information layer.

In some embodiments, the shielding module 1760 is further configured to: determine a superimposing location on the display layer according to a relative location between the fourth target event and the virtual character in response to the virtual character being influenced by the fourth target event in the virtual environment; and superimpose the second mask layer on the superimposing location of the display layer.

In some embodiments, the user interface further includes: an operation control, the operation control being configured to control activities of the virtual character in the virtual environment. The operation control is located at an operation layer. The shielding module 1760 is further configured to superimpose the second mask layer between the superimposing location of the display layer and the operation layer.

In some embodiments, the shielding module 1760 is further configured to: obtain a scope of influence of the target event; and determine a type of the target event according to the scope of influence of the target event.

In some embodiments, the shielding module 1760 is further configured to: determine the type of the target event as the first target event in a case that the scope of influence of the target event includes a blur effect layer; determine the type of the target event as the second target event in a case that the scope of influence of the target event includes the information layer but does not include the blur effect layer; determine the type of the target event as the third target event in a case that the scope of influence of the target event includes the mask layer but does not include the information layer; and determine the type of the target event as the fourth target event in a case that the scope of influence of the target event includes the display layer but does not include the mask layer.

In some embodiments, the shielding module 1760 is further configured to: display, in response to the virtual character being influenced by a visual interference event in the virtual environment, the virtual environment picture as the shielded state and landforms presented by the map presentation control as the blurred state; and display a sound event icon in a clear state on the map presentation control in response to the virtual character being influenced by a sound event in the virtual environment during the visual interference event.

In some embodiments, the virtual environment picture is at a display layer, the map presentation control is at an information layer, and the information layer is higher than the display layer. The shielding module 1760 is further configured to: superimpose a mask layer on the display layer and a blur effect layer on the information layer in response to the virtual character being influenced by the visual interference event in the virtual environment; and superimpose a clear effect layer on the information layer in response to the virtual character being influenced by the sound event in the virtual environment during the visual interference event. The clear effect layer is only configured to display the sound event icon in the clear state.

According to some embodiments, each module in the apparatus may exist respectively or be combined into one or more units. Certain (or some) unit in the units may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In some embodiments, the apparatus may further include other units. In actual applications, these functions may also be realized cooperatively by the other units, and may be realized cooperatively by multiple units.

Figure 18:
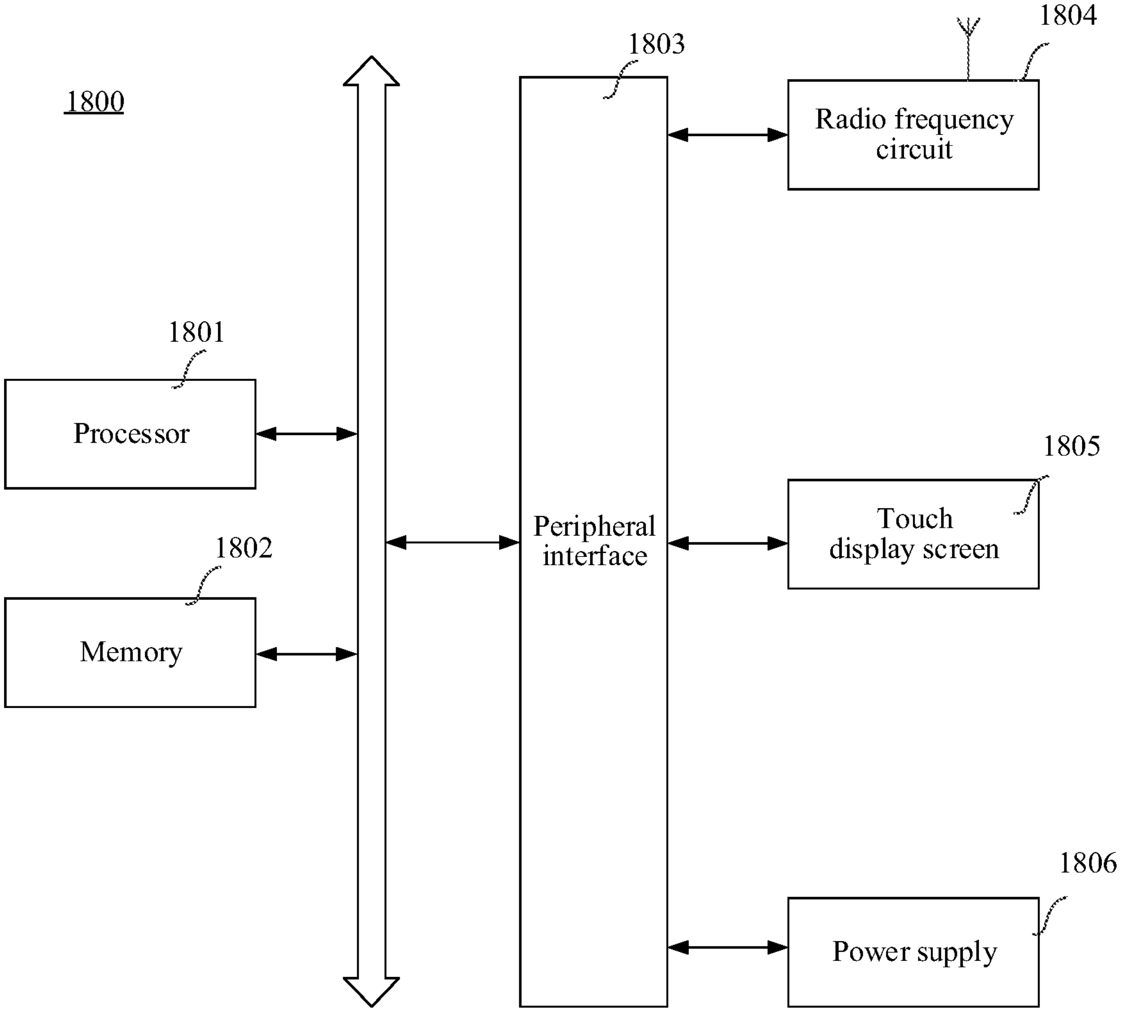
FIG. 18 is a schematic diagram of an apparatus structure of a computer device according to some embodiments.

FIG. 18 shows a structural block diagram of a computer device 1800 according to some embodiments. The computer device 1800 may be a portable mobile terminal, for example: a smartphone, a tablet personal computer, a moving picture experts group audio layer III (MP3) player, or a moving picture experts group audio layer IV (MP4) player. The computer device 1800 may also be referred to as user equipment, a portable terminal, or another name.

Generally, the computer device 1800 includes: a processor 1801 and a memory 1802.

The processor 1801 may include one or more processing cores, such as a 4-core processor or an 8-core processor. The processor 1801 may be implemented by at least one hardware form in a digital signal processing (DSP), a field programmable gate array (FPGA), and a programmable logic array (PLA). The processor 1801 may further include a main processor and a co-processor. The main processor is a processor for processing data in a wake-up state, and is also referred to as a central processing unit (CPU). The co-processor is a low-power processor for processing data in a standby state. In some embodiments, the processor 1801 may be integrated with a graphics processing unit (GPU). The GPU is responsible for rendering and drawing content to be displayed by a display screen. In some embodiments, the processor 1801 may further include an artificial intelligence (AI) processor. The AI processor is configured to process computing operations related to machine learning.

The memory 1802 may include one or more computer-readable storage media. The computer-readable storage media may be tangible and non-transitory. The memory 1802 may further include a high-speed random access memory and a nonvolatile memory, for example, one or more disk storage devices or flash storage devices. In some embodiments, the non-transitory computer-readable storage medium in the memory 1802 is configured to store at least one instruction. The at least one instruction is used for execution by the processor 1801 to implement the user interface display method according to the foregoing embodiments.

In some embodiments, the computer device 1800 may further include: a peripheral interface 1803 and at least one peripheral. Specifically, the peripheral includes: at least one of a radio frequency circuit 1804, a touch display screen 1805, and a power supply 1806.

The peripheral interface 1803 may be configured to connect the at least one peripheral related to input/output (I/O) to the processor 1801 and the memory 1802. In some embodiments, the processor 1801, the memory 1802 and the peripheral interface 1803 are integrated on the same chip or circuit board. In some other embodiments, any one or two of the processor 1801, the memory 1802 and the peripheral interface 1803 may be implemented on a separate chip or circuit board. This is not limited by this embodiment.

The radio frequency circuit 1804 is configured to receive and transmit a radio frequency (RF) signal, also referred to as an electromagnetic signal. The radio frequency circuit 1804 communicates with a communication network and other communication devices through the electromagnetic signal. The radio frequency circuit 1804 converts electrical signals into electromagnetic signals for transmission, or converts received electromagnetic signals into electrical signals. In some embodiments, the radio frequency circuit 1804 includes: an antenna system, an RF transceiver, one or more amplifiers, a tuner, an oscillator, a digital signal processor, a codec chip set, a subscriber identity module card, and the like. The radio frequency circuit 1804 may communicate with other terminals through at least one wireless communication protocol. The wireless communication protocol includes, but is not limited to: World Wide Web, metropolitan area networks, intranets, generations of mobile communication networks (2G, 3G, 4G, and 5G), wireless local area networks, and/or wireless fidelity (WiFi) networks. In some embodiments, the radio frequency circuit 1804 may further include a circuit related to near field communication (NFC). This is not limited herein.

The touch display screen 1805 is configured to display a user interface (UI). The UI may include a graph, text, an icon, a video, and any combination thereof. The touch display screen 1805 also has the ability to collect a touch signal at or above the surface of the touch display screen 1805. The touch signal may be inputted to the processor 1801 as a control signal for processing. The touch display screen 1805 is configured to provide virtual buttons and/or virtual keyboards, also referred to as soft buttons and/or soft keyboards. In some embodiments, there may be one touch display screen 1805 disposed on a front panel of the computer device 1800. In some other embodiments, there may be at least two touch display screens 1805 respectively disposed on different surfaces of the computer device 1800 or in a folded design. In still other embodiments, the touch display screen 1805 may be a flexible display screen disposed on a curved or folded surface of the computer device 1800. Even further, the touch display screen 1805 may be arranged in a non-rectangular irregular pattern, namely a special-shaped screen. The touch display screen 1805 may be made of materials such as liquid crystal display (LCD) and organic light-emitting diode (OLED).

The power supply 1806 is configured to power the various assemblies in the computer device 1800. The power supply 1806 may be alternating current, direct current, disposable or rechargeable batteries. When the power supply 1806 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

It is to be understood by a person skilled in the art that the structure shown in FIG. 18 is not limiting of the computer device 1800 and may include more or fewer assemblies than illustrated, or some assemblies may be combined, or different assembly arrangements may be employed.

Some embodiments provide a computer device. The computer device includes a processor and a memory. The memory stores at least one instruction. The at least one instruction is loaded and executed by the processor to implement the user interface display method according to the foregoing method embodiments.

some embodiments provide a non-transitory computer-readable storage medium. The storage medium stores at least one instruction. The at least one instruction is loaded and executed by a processor to implement the user interface display method according to the foregoing method embodiments.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A user interface display method, performed by a terminal, the method comprising:

displaying a virtual environment image, an operation control, and a minimap, the virtual environment image being an image in which a virtual environment around a virtual character, which is located in a virtual world, is observed from a perspective of the virtual character, wherein the minimap presents a thumbnail of the virtual world in which the virtual character is located;

controlling, based on a control input via the operation control, activities of the virtual character in the virtual environment; and displaying, based on the virtual character being influenced by a target event in the virtual environment, the virtual environment image in a shielded state and the minimap in a blurred state, the shielded state and the blurred state being visually distinct.

2. The user interface display method according to claim 1, wherein the displaying, based on the virtual character being influenced by the target event in the virtual environment, the virtual environment image in the shielded state and the minimap in the blurred state comprises:

displaying, based on the virtual character being influenced by a first target event in the virtual environment, all image contents in the virtual environment image in the shielded state and all information on the minimap in the blurred state; and displaying, based on the virtual character being influenced by a second target event in the virtual environment, the all image contents in the virtual environment image in the shielded state and partial information on the minimap in the blurred state.

3. The user interface display method according to claim 2, wherein the virtual environment image is at a display layer, the minimap is at an information layer, and the information layer is an upper layer of the display layer;

the displaying, based on the virtual character being influenced by the first target event in the virtual environment, the all image contents in the virtual environment image in the shielded state and the all information on the minimap in the blurred state comprises:

superimposing a first mask layer on the display layer and a first blur effect layer on the information layer based on the virtual character being influenced by the first target event in the virtual environment; and the displaying, based on the virtual character being influenced by the second target event in the virtual environment, the all image contents in the virtual environment image in the shielded state and the partial information on the minimap in the blurred state comprises:

superimposing the first mask layer on the display layer and a second blur effect layer on the information layer based on the virtual character being influenced by the second target event in the virtual environment, the first mask layer being a mask layer for masking all virtual environment images, the first mask layer being a lower layer of the information layer, and a blur effect of the first blur effect layer being stronger than the blur effect of the second blur effect layer.

4. The user interface display method according to claim 3, wherein the user interface display method further comprises:

displaying the operation control, the operation control being configured to control activities of the virtual character in the virtual environment; and continuing to display the operation control on a user interface.

5. The user interface display method according to claim 4, wherein the operation control is located at an operation layer; and the superimposing the first mask layer on the display layer comprises:

superimposing the first mask layer between the display layer and the operation layer.

6. The user interface display method according to claim 2, wherein the user interface display method further comprises:

displaying, based on the virtual character being influenced by a third target event in the virtual environment, the all image contents in the virtual environment image in the shielded state and displaying the minimap in a clear state; and displaying, based on the virtual character being influenced by a fourth target event in the virtual environment, partial image contents in the virtual environment image in the shielded state and displaying the minimap in the clear state.

7. The user interface display method according to claim 6, wherein the virtual environment image is at a display layer, the map presentation control is at an information layer, and the information layer is an upper layer of the display layer;

the displaying, based on the virtual character being influenced by the third target event in the virtual environment comprises:

superimposing a first mask layer on the display layer based on the virtual character being influenced by the third target event in the virtual environment; and the displaying, based on the virtual character being influenced by the fourth target event in the virtual environment, comprises:

superimposing a second mask layer on the display layer based on the virtual character being influenced by the fourth target event in the virtual environment, the first mask layer being a mask layer for masking the all image contents in the virtual environment image, the second mask layer being a mask layer for masking the partial image contents in the virtual environment image, and the first mask layer and the second mask layer being both lower layers of the information layer.

8. The user interface display method according to claim 7, wherein the superimposing the second mask layer on the display layer comprises:

determining a superimposing location on the display layer according to a relative location between the fourth target event and the virtual character based on the virtual character being influenced by the fourth target event in the virtual environment; and superimposing the second mask layer on the superimposing location of the display layer.

9. The user interface display method according to claim 8, wherein the user interface display method further comprises:

displaying the operation control, the operation control being configured to control activities of the virtual character in the virtual environment, the operation control being located at an operation layer; and superimposing the second mask layer between the superimposing location of the display layer and the operation layer.

10. The user interface display method according to claim 9, wherein the user interface display method further comprises:

obtaining a scope of influence of the target event; and determining a type of the target event according to the scope of influence of the target event.

11. The user interface display method according to claim 10, wherein the determining the type of the target event comprises:

determining the type of the target event as the first target event based on the scope of influence of the target event comprising a blur effect layer;

determining the type of the target event as the second target event based on the scope of influence of the target event comprising the information layer but not comprising the blur effect layer;

determining the type of the target event as the third target event based on the scope of influence of the target event comprising the mask layer but not comprising the information layer; and determining the type of the target event as the fourth target event based on the scope of influence of the target event comprising the display layer but not comprising the mask layer.

12. The user interface display method according to claim 1, wherein the displaying, based on the virtual character being influenced by the target event in the virtual environment, the virtual environment image in the shielded state and the minimap in the blurred state comprises:

displaying, based on the virtual character being influenced by a visual interference event in the virtual environment, the virtual environment image in the shielded state and landforms presented by the minimap in the blurred state; and displaying a sound event icon in a clear state on the minimap based on the virtual character being influenced by a sound event in the virtual environment during the visual interference event.

13. The user interface display method according to claim 12, wherein the virtual environment image is at a display layer, the minimap is at an information layer, and the information layer is an upper layer of the display layer;

the displaying, based on the virtual character being influenced by the visual interference event in the virtual environment, the virtual environment image in the shielded state and landforms presented by the minimap in the blurred state, and displaying the sound event icon in the clear state on the minimap based on the virtual character being influenced by the sound event in the virtual environment during the visual interference event comprises:

superimposing a mask layer on the display layer and a blur effect layer on the information layer based on the virtual character being influenced by the visual interference event in the virtual environment; and superimposing a clear effect layer on the information layer based on the virtual character being influenced by the sound event in the virtual environment during the visual interference event, the clear effect layer being only configured to display the sound event icon in the clear state.

14. A user interface display apparatus, the apparatus comprising:

at least one memory configured to store program code; and at least one processor configured to read the program code and operate as instructed by the program code, the program code comprising:

display code configured to cause the at least one processor to display a virtual environment image, an operation control and a minimap, the virtual environment image being an image in which a virtual environment around a virtual character, which is located in a virtual world, is observed from a perspective of the virtual character, wherein the minimap presents a thumbnail of the virtual world in which the virtual character is located;

control code configured to cause the at least one processor to control, based on a control input via the operation control, activities of the virtual character in the virtual environment; and shielding code configured to cause the at least one processor to display, based on the virtual character being influenced by a target event in the virtual environment, the virtual environment image in a shielded state and the map presentation control in a blurred state, the shielded state and the blurred state being visually distinct.

15. The user interface display apparatus according to claim 14, wherein the shielding code is further configured to cause the at least one processor to:

display, based on the virtual character being influenced by a first target event in the virtual environment, all image contents in the virtual environment image in the shielded state and all information on the minimap in the blurred state; and display, based on the virtual character being influenced by a second target event in the virtual environment, the all image contents in the virtual environment image in the shielded state and partial information on the minimap in the blurred state.

16. The user interface display apparatus according to claim 15, wherein the virtual environment image is at a display layer, the minimap is at an information layer, and the information layer is an upper layer of the display layer; and the shielding code is further configured to cause the at least one processor to:

superimpose a first mask layer on the display layer and a first blur effect layer on the information layer based on the virtual character being influenced by the first target event in the virtual environment; and superimpose the first mask layer on the display layer and a second blur effect layer on the information layer based on the virtual character being influenced by the second target event in the virtual environment, the first mask layer being a mask layer for masking all virtual environment images, the first mask layer being a lower layer of the information layer, and a blur effect of the first blur effect layer being stronger than the blur effect of the second blur effect layer.

17. The user interface display apparatus according to claim 16, wherein the display code is further configured to cause the at least one processor to display the operation control, the operation control being configured to control activities of the virtual character in the virtual environment; and the program code further comprises:

operation code configured to cause the at least one processor to continue to display the operation control on a user interface.

18. The user interface display apparatus according to claim 17, wherein the operation control is located at an operation layer; and the shielding code is further configured to cause the at least one processor to:

superimpose the first mask layer between the display layer and the operation layer.

19. The user interface display apparatus according to claim 15, wherein the shielding code is further configured to cause the at least one processor to:

display, based on the virtual character being influenced by a third target event in the virtual environment, the all image contents in the virtual environment image in the shielded state and keep displaying the minimap in a clear state; and display, based on the virtual character being influenced by a fourth target event in the virtual environment, partial image contents in the virtual environment image in the shielded state and continue to display the minimap in the clear state.

20. A non-transitory computer-readable storage medium storing computer code that when executed by at least one processor causes the at least one processor to:

display a virtual environment image, an operation control, and a minimap, the virtual environment image being an image in which a virtual environment around a virtual character, which is located in a virtual world, is observed from a perspective of the virtual character, wherein the minimap presents a thumbnail of the virtual world in which the virtual character is located;

control, based on a control input via the operation control, activities of the virtual character in the virtual environment; and display, based on the virtual character being influenced by a target event in the virtual environment, the virtual environment image in a shielded state and the minimap in a blurred state, the shielded state and the blurred state being visually distinct.

* * * * *